United States Patent
Sorenson et al.

(12) 
(10) Patent No.: US 12,384,222 B1
(45) Date of Patent: Aug. 12, 2025

(54) RECREATIONAL VEHICLES WITH ON-BOARD INTELLIGENCE

(71) Applicant: Winnebago Industries, Inc., Forest City, IA (US)

(72) Inventors: Jamie Sorenson, Hanlontown, IA (US); William Cavanaugh, Nashotah, WI (US); Logan Hall, Ames, IA (US); Joshua Kossel, Verona, WI (US)

(73) Assignee: Winnebago Industries, Inc., Eden Prairie, MN (US)

( * ) Notice: Subject to any disclaimer, the term of this patent is extended or adjusted under 35 U.S.C. 154(b) by 622 days.

(21) Appl. No.: 17/565,751

(22) Filed: Dec. 30, 2021

Related U.S. Application Data

(60) Provisional application No. 63/139,166, filed on Jan. 19, 2021.

(51) Int. Cl.
| | | |
|---|---|---|
| *B60H 1/00* | (2006.01) | |
| *B60R 16/023* | (2006.01) | |
| *B60R 16/033* | (2006.01) | |
| *H02G 3/18* | (2006.01) | |
| *B60P 3/32* | (2006.01) | |

(52) U.S. Cl.
CPC ..... *B60H 1/00792* (2013.01); *B60R 16/0238* (2013.01); *B60R 16/033* (2013.01); *H02G 3/18* (2013.01); *B60P 3/32* (2013.01)

(58) Field of Classification Search
CPC ............ B60H 1/00792; B60R 16/0238; B60R 16/033; H02G 3/18; B60P 3/32
See application file for complete search history.

(56) References Cited

U.S. PATENT DOCUMENTS

| | | |
|---|---|---|
| 9,505,307 B2 | 11/2016 | Champagne et al. |
| 2014/0022389 A1 | 1/2014 | Kageta |
| 2014/0375272 A1 | 12/2014 | Johnsen et al. |
| 2020/0101848 A1* | 4/2020 | Murakami .............. B60L 53/22 |
| 2020/0238928 A1 | 7/2020 | Sandu et al. |
| 2020/0242855 A1 | 7/2020 | Sandu et al. |
| 2020/0245144 A1 | 7/2020 | Sandu et al. |
| 2020/0324653 A1 | 10/2020 | Breen |
| 2023/0170513 A1* | 6/2023 | Friedman ................ B60L 53/62 |

OTHER PUBLICATIONS

Spartan Connected Coach, https://info.spartanmotors.com/connected-coach, downloaded on Dec. 15, 2021, 3 pages.

(Continued)

*Primary Examiner* — Daniel Cavallari
(74) *Attorney, Agent, or Firm* — Faegre Drinker Biddle & Reath LLP

(57) ABSTRACT

A recreational vehicle includes a power source, a first electrical junction box, a second electrical junction box, a chassis power subsystem, and a recreational vehicle (RV) power subsystem. The first electrical junction box is electrically coupled between the power source and the second electrical junction box, the first electrical junction box is electrically coupled between the power source and the chassis power subsystem, and the second electrical junction box is electrically coupled between the first electrical junction box and the RV power subsystem.

20 Claims, 14 Drawing Sheets

(56) References Cited

OTHER PUBLICATIONS

Spartan Motors, Inc. Press Release, https://www.prnewswire.com/news-releases/spartan-motors-introduces-spartan-connected-coach-improved-driver-interface-with-select-2019-entegra-coaches-at-fmcas-97th-international-convention--rv-expo-300614690.html, Mar. 15, 2018, 2 pages.
Airstream Smart Control Technology, https://www.airstream.com/travel-trailers/classic/smart-control-technology/, 1 page.
Foretravel Motorcoach, the Foretravel Realm FS605 The REALM of dreams is here; www.foretravel.com (2022) 27 pages.
Schaudt Gmbh, www.schaudt.gmbh/de/produkte/reisemobilesystem.php, 2 pages.
RV Whisper LLC, User Manual, RV Whisper Monitor System, rvwhisper.com, Sep. 30, 2019, 16 pages.
Crestron Electronics Inc, Crestron SW-FUSION-RV, Integrated Automation Software for Control and Monitoring Networks, product specification; https://www.crestron.com, 14 pages.
REV Group, Smart Flo™ Integrated Pressure Governor System for Fire Apparatus, product description, downloaded on Dec. 15, 2021 from https://www.revgroup.com, 5 pages.
Asa Electronics, iN Command Control Systems NCSP3, RV Control and Monitoring System Installation and Operation Manual (2016), 45 pages.
Lippert Components, MYRV® With Onecontrol™ Touch Panel, Master Owner's Manual-Electronics, Sep. 25, 2019, 52 pages.
Nordelettronica Srl, Nordpanel Informational brochure, 2 pages.
Katie Harris, Outbound Living article, Mercedes Unveils 3 New Innovative Smart Camper Vans, Sep. 29, 2018, downloaded Dec. 15, 2021 from https://outboundliving.com/mercedes-new-innovative-camper-vans/, 9 pages.
Liberty Coach—First Black, Custom Crestron Control System, webpage accessed Dec. 15, 2021 from https://libertycoach.com/category/first-black/, 2 pages.
Newell Coach Corp.; Newell P50—Newell Intrepid™ House Management System, https://www.newell.coach.com, 9 pages.
Intrepid Controls Systems, Inc.; RAD-Star BroadR-Reach® (100BASE-T1) / Ethernet Active Tap, User's Guide Version 1.2—Jun. 1, 2016, 26 pages.
InterMotive Vehicle Controls—Commercial vehicle safety and performance optimization products, www.Intermotive.net; 4 pages.
Dometic Corporation, Dometic Interact Operation Manual (2020), 76 pages.
RV Intelligence, Smart RV Controls Hardware Installation Guide, 9 pages.
Hymer GmbH & Co. KG, Hymer Connect App Informational brochure, Mar. 2021, 4 pages.
Hobby-Wohnwagenwerk, Hobby van Owner's Manual, Oct. 2018, 209 pages.
Spyder Controls Corp., Multiplex Integration Schematic—2019 Allegro Open Road, Control Panel Manual, 15 pages.
Garmin Ltd., RV-IN1501 RV Infotainment System Owners Manual (2019) 36 pages.
Freightliner Custom Chassis Corp., Optiview™ Informational brochure, 4 pages.
Schaudt GmbH, SCHAUDT®, Control and Display Panel DT 220 C, Instruction Manual, Mar. 5, 2010, 28 pages.
Cummins Onan—Energy Command 30, Operator and Installation Manual, Dec. 2007, 29 pages.
Winegard Company, Winegard ConnecT 2.0, Installation/Operation Manual (2017), 12 pages.
Intellitec Command Center Part No. 00-01107-000, Product Description, Jun. 20, 2018, 5 pages.
KiddBott Technologies, Inc., CoachProxy™ Quick Start Guide, Jun. 8, 2016, 6 pages.
RV Intelligence, Smart RV Controls User Manual, 15 pages.
CBE S.r.L., CBE Electronics for Caravanning and Boating, Product Catalogue (2020/2021), 29 pages.
Leisure Telematics B.V., CaraControl—Mobile Applications for Smartphones and Tablets, User Manual, 25 pages.
Ford Motor Co., 2022 Ford Transit Connect®—Passenger Wagon-Cargo Van (2021), 13 pages.
RAM Commercial Dealer Process, 2019 Ram Promaster Uconnect® Product brochure, 19 pages.
Xantrex—Freedom X Inverter Owner's Guide (2019), 98 pages.
SliverLeaf Electronics, Inc., VMSpc Owner's Manual Version 4xB, 32 pages.
Firefly Integrations, Product Catalog, Vegatouch Universal Coach Control, 24 pages.
Truma, Explore new horizons in RV comfort-Truma product innovations 2020 (Jan. 2020), 17 pages.
THOR Industries, Thor Motor Coach, Best Trip Planning Tool—TOGO RV Plus, webpage accessed Feb. 21, 2022 from https://www.thormotorcoach.com/togo-rv/, 5 pages.
Marathon Coach, Inc., Marathon Coach Excellence by Design, company facts/product information (TechLink), 3 pages.
Swift, Swift Command 2019, App User Guide Rev. 02, https://www.swiftgroup.co.uk/, 14 pages.

\* cited by examiner

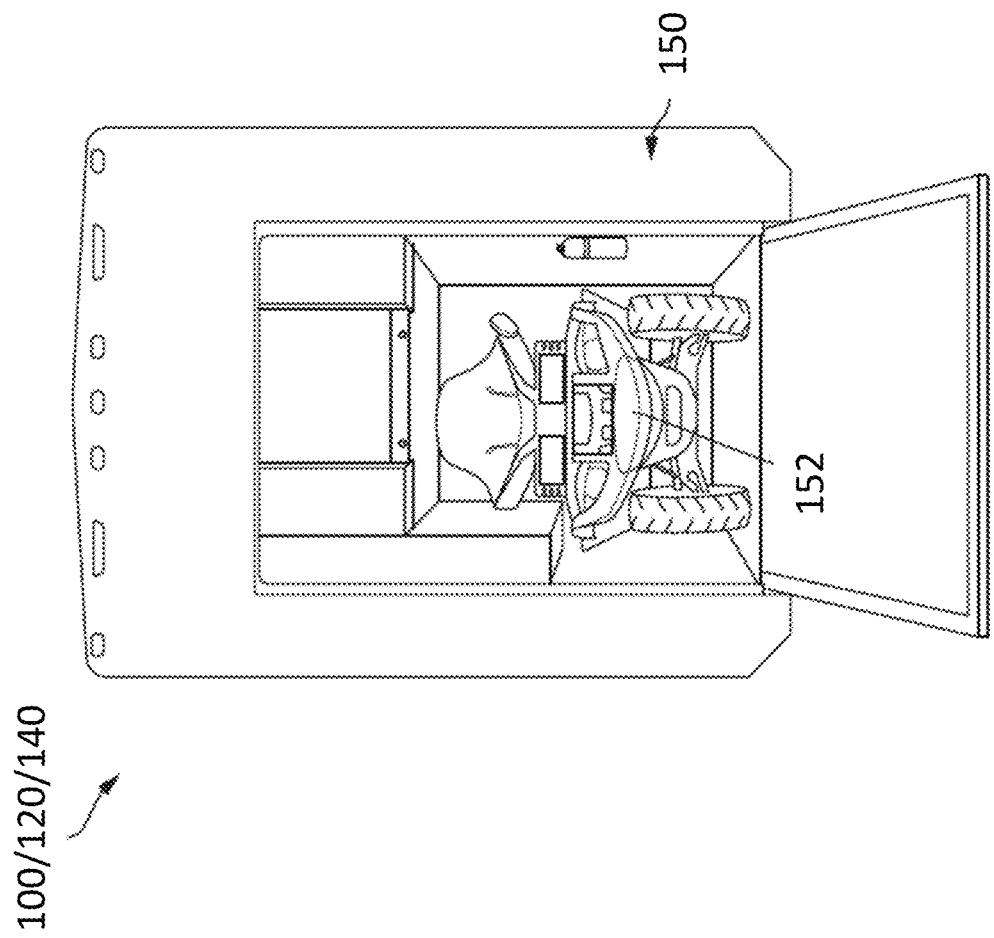

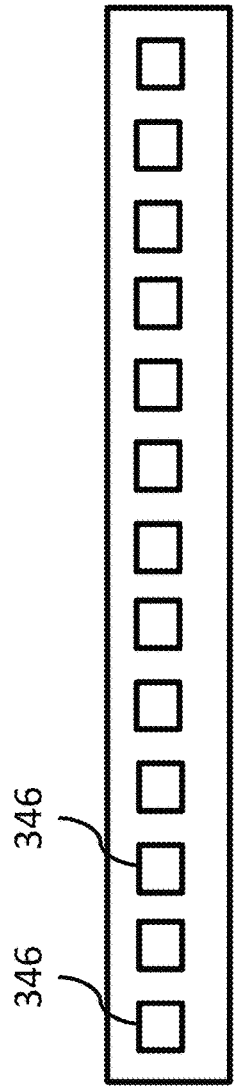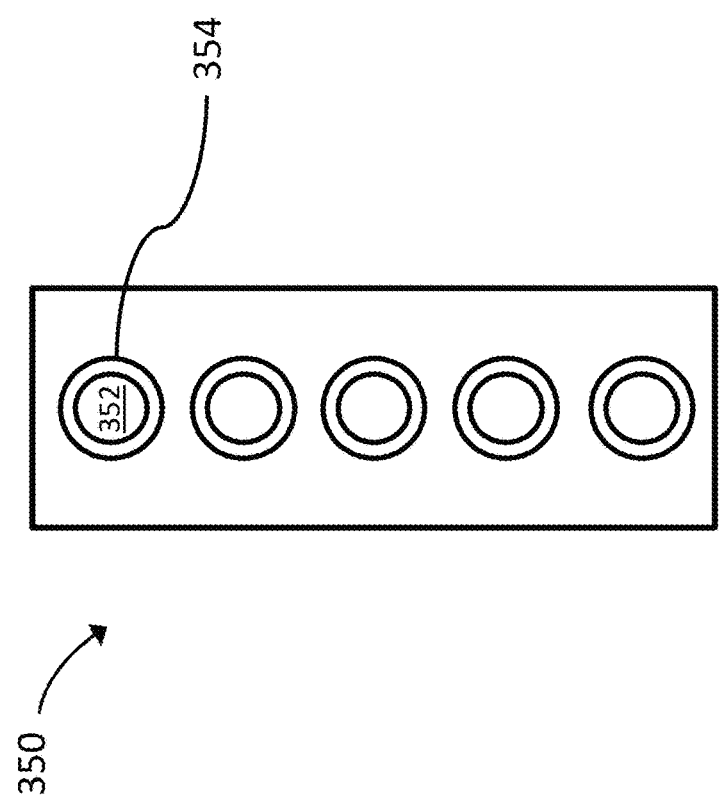

RECREATIONAL VEHICLES WITH ON-BOARD INTELLIGENCE

CROSS-REFERENCE TO RELATED APPLICATION

This application claims priority to Provisional Application No. 63/139,166, filed Jan. 19, 2021, which is herein incorporated by reference in its entirety.

SUMMARY

Certain embodiments of the present disclosure describe various systems, subsystems, components, and methods for use with vehicles such as recreational vehicles.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIGS. 1A-1D show various examples of recreational vehicles, in accordance with certain embodiments of the present disclosure.

FIGS. 5A and 5B show various arrangements of battery capacity indicators, in accordance with certain embodiments of the present disclosure.

Figure 1A:
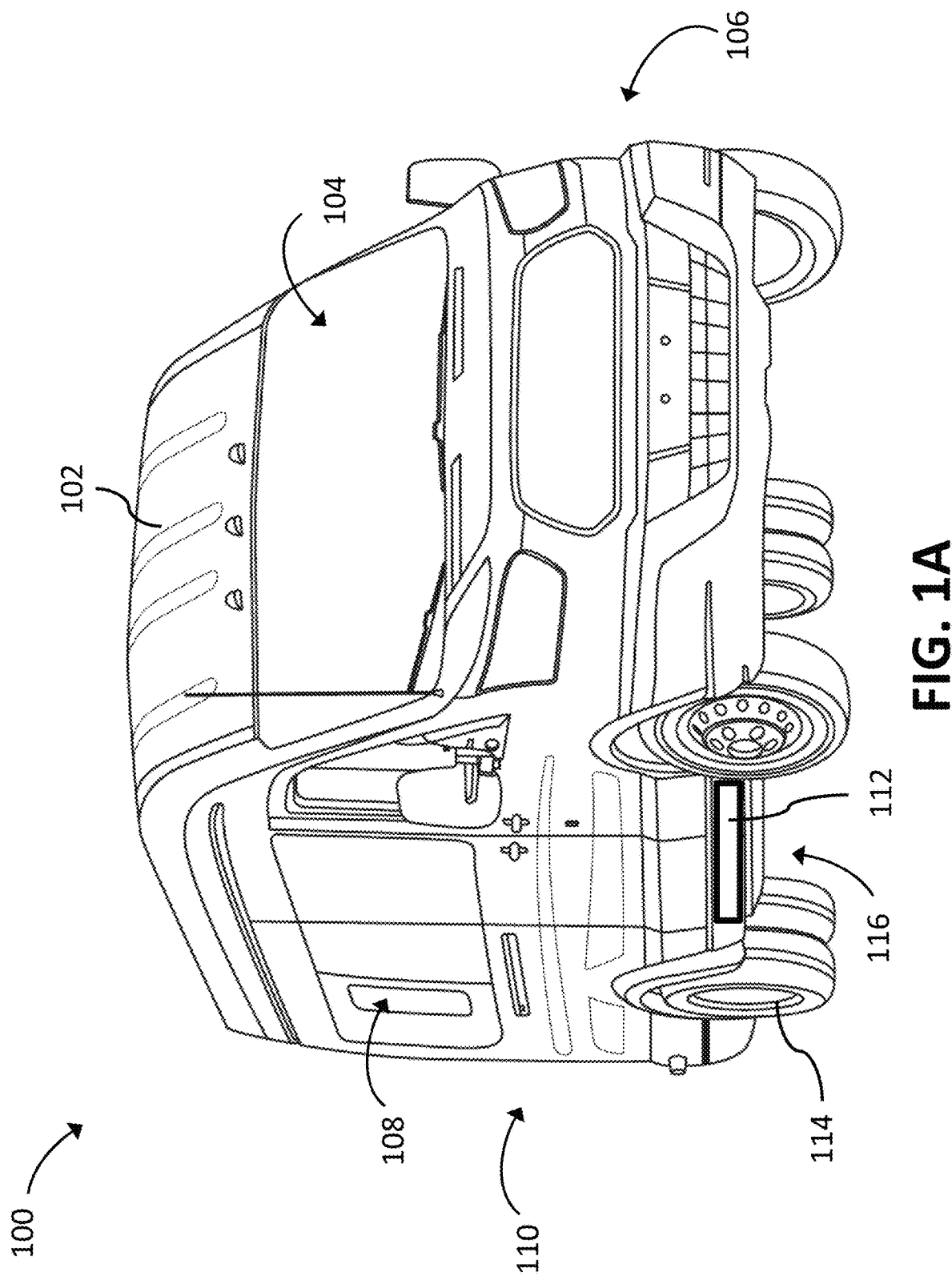

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope the appended claims.

DETAILED DESCRIPTION

FIG. 1A shows a recreational vehicle 100 having a body 102 that houses a cab area 104 at a front end 106 of the recreational vehicle 100 and a living space area 108 positioned between the cab area 104 and a rear end 110 of the recreational vehicle 100. The recreational vehicle 100 can include one or more power sources (represented by block 112 for simplicity of illustration) that are operably coupled to (e.g., via a transmission, shafts) front and/or rear axles and that provide the energy to rotate the axle(s) and/or wheels 114 and therefore propel the recreational vehicle 100. The power source 112 can include an engine (e.g., gas engine or diesel engine), rechargeable batteries, fuel cell, or a combination (e.g., hybrid) of an engine and rechargeable batteries, etc.

In embodiments where the recreational vehicle 100 is at least partially powered and propelled by electricity created by batteries 112, the batteries 112 can be distributed throughout the chassis of the recreational vehicle 100. For example, the batteries 112 may be positioned below a floor of the living space area 108 of the recreational vehicle 100. In certain embodiments, the batteries 112 power electric motors that rotate one or more of the wheels 114 (e.g., by rotating the axles or by directly rotating the wheels).

Figure 1B:
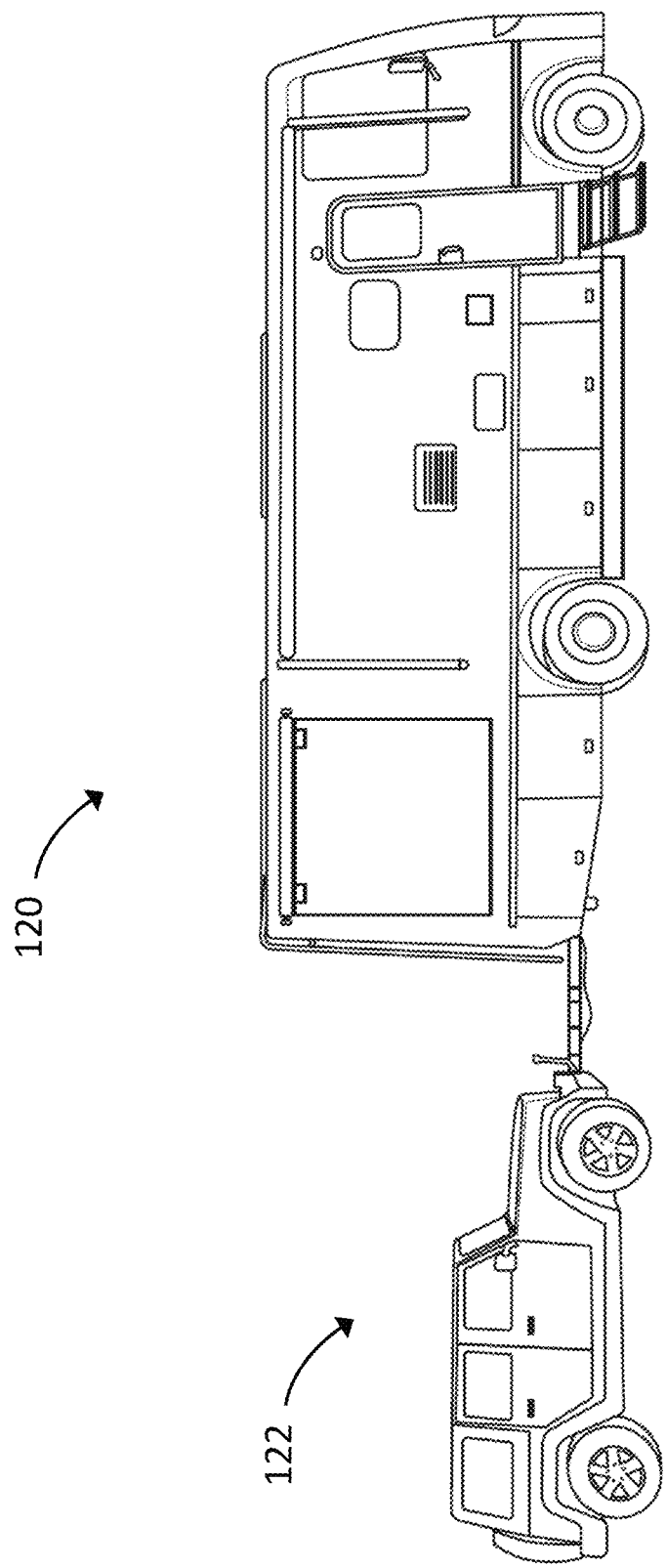

FIG. 1B shows a different example of a recreational vehicle 120, which is coupled to a vehicle 122 such as a car, truck, or sport utility vehicle. The vehicle 122 can be mechanically coupled to the recreational vehicle 120 (e.g., via a hitch) such that the vehicle 122 can be towed or pulled by the recreational vehicle 100. As will be described in more detail below, the recreational vehicle 100 can also be commutatively and electrically coupled to the vehicle 122 (or other types of vehicles) such that the vehicles can exchange data and power signals.

Although FIG. 1B shows the towed vehicle as being a vehicle, in certain embodiments, the recreational vehicle 120 can tow a trailer. The trailer could support the vehicle 122 or could support smaller motorized or electric-powered vehicles such as motorcycles and all-terrain vehicles or could support marine equipment such as boats. As such, the recreational vehicle 120 can tow a variety of smaller vehicles and equipment. The recreational vehicles 100/120 can be what is referred to a Class A, Class B, or Class C recreational vehicle or another type of motorized recreational vehicle.

Figure 1C:
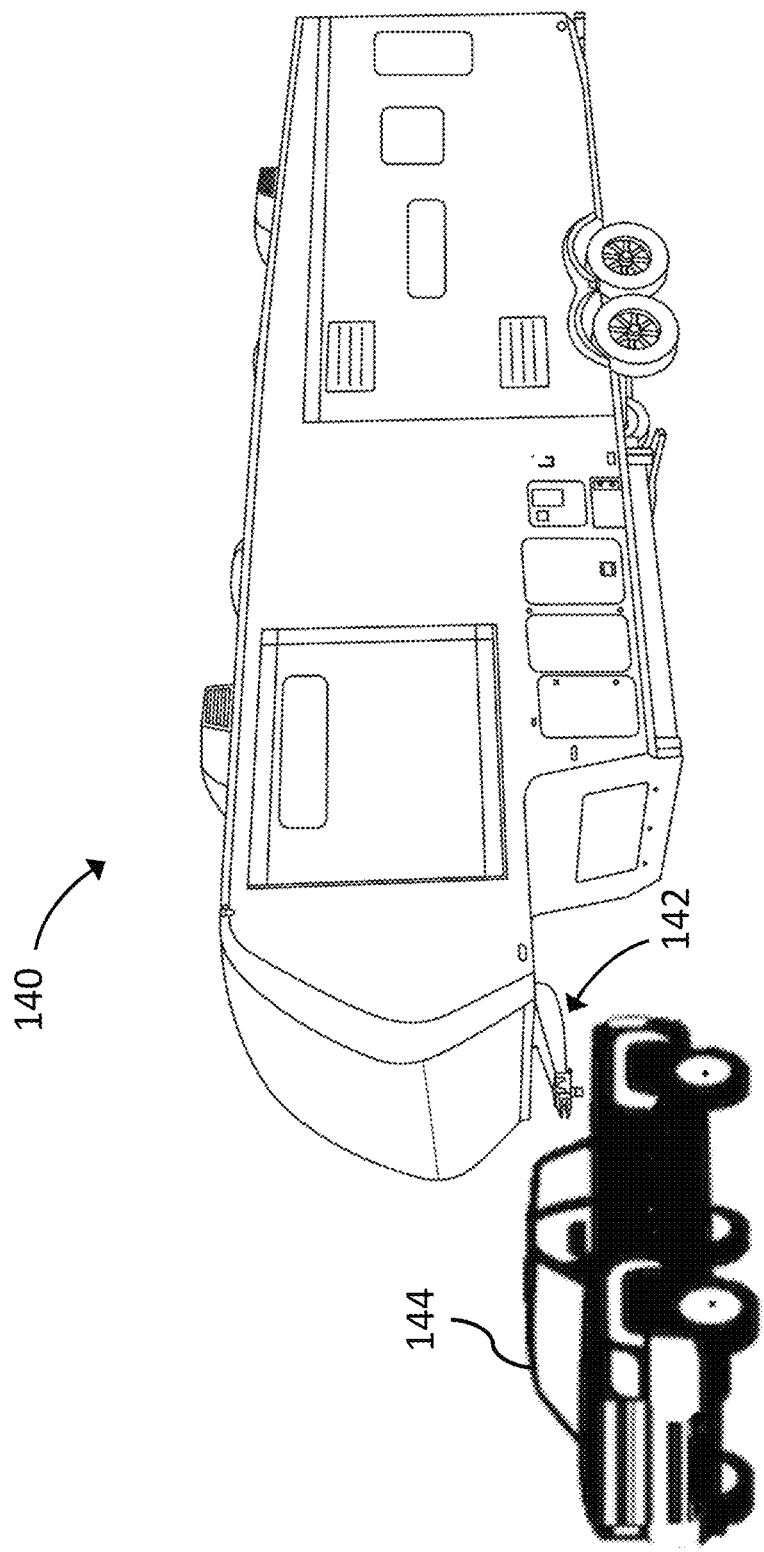

FIG. 1C shows a towable recreational vehicle 140 that includes a hitch 142 positioned at a front end of the recreational vehicle 140. The recreational vehicle 140 can be what is referred to a toy hauler, 5th-wheel, travel trailer, or other types of towable recreational vehicles. As shown in FIG. 1C, the recreational vehicle 140 is coupled to a vehicle 144 such as a car, truck, or sport utility vehicle. The vehicle 144 can be mechanically coupled to the recreational vehicle 144 (e.g., via the hitch 142) such that the vehicle 144 can tow or pull the recreational vehicle 140. As will be described in more detail below, the recreational vehicle 140 can also be commutatively and electrically coupled to the vehicle 144 (or other types of vehicles such as all-terrain vehicles or motorcycles) such that the vehicles can exchange data and power signals.

As shown in FIG. 1D, the recreational vehicles 100/120/140 can include a garage 150 at the rear end of the recreational vehicle 100/120/140. The garage 150 can hold and support vehicles such as an all-terrain vehicle 152 and/or motorcycle.

Power System

Figure 2:
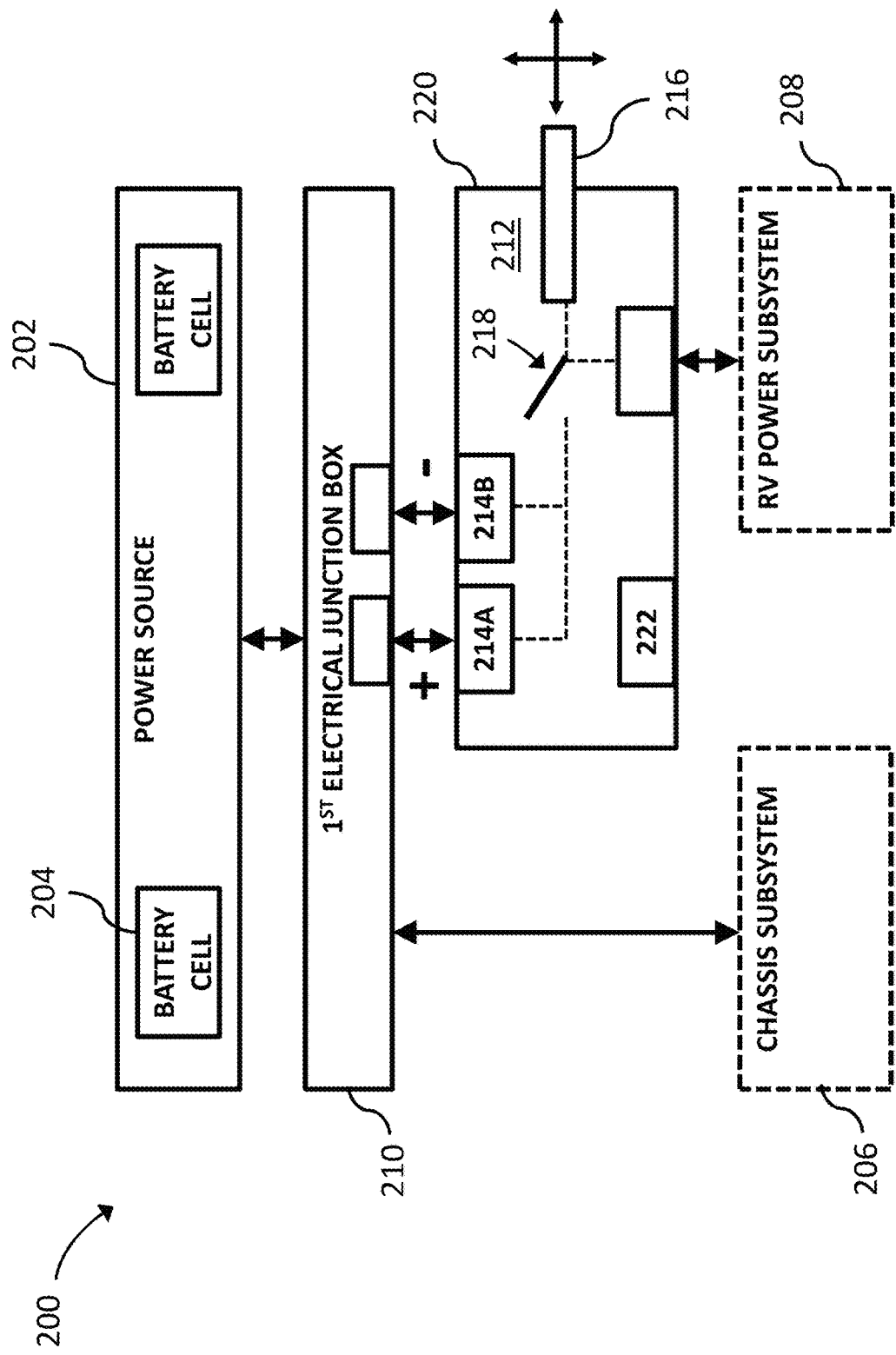
FIG. 2 shows a schematic of a power system of a recreational vehicle, in accordance with certain embodiments of the present disclosure.

FIG. 2 shows a block diagram of a power system 200 for use with recreational vehicles. For simplicity, the description below refers to the recreational vehicle 100 of FIG. 1 in connection with the power system 200, however the other recreational vehicles shown in the figures and described above could incorporate the power system 200.

The power system 200 includes a power source 202. The power source 202 can include an assembly or pack of battery cells 204 and various components for managing temperature (e.g., fans, cooling subsystem) of the assembly/pack.

The power system 200 also includes a chassis power subsystem 206. The chassis power subsystem 206 includes powertrain components used to propel the recreational vehicle 100 such as motors that, directly or indirectly, rotate the wheels 114 (as shown in FIG. 1). The chassis power subsystem 206 also includes components used to operate, at least, basic functions of the recreational vehicle 100 such as brake lights, headlights, dash lights, dash air-conditioning, windshield wiper motors, steering, etc. In short, the chassis power subsystem 206 includes components that are assembled to the vehicle by its manufacturer before the vehicle is delivered to a recreational vehicle manufacturer and outfitted with additional subsystems and components for using the vehicle as a recreational vehicle.

The power system 200 includes an RV power subsystem 208, which is described in greater detail below. In short, the RV power subsystem 208 includes additional subsystems and components installed by a recreational vehicle manufacturer such as subsystems and components for temperature control, storing and preparing food, operating appliances, supplying and disposing of water and waste, etc.

The power system 200 also includes a first electrical junction box 210 (e.g., a first high-voltage junction box) and a second electrical junction box 212 (e.g., a second high-voltage junction box). The first electrical junction box 210 is electrically coupled between the power source 202 and the chassis power subsystem 206. The first electrical junction box 210 is also electrically coupled between the power source 202 and the second electrical junction box 212. In certain embodiments, the first electrical junction box 210 and the second electrical junction box 212 are positioned under a hood of the recreational vehicle 100 where an engine would typically be located.

The first electrical junction box 210 receives a high-voltage input (e.g., 60 volts or higher such as 350-700 volts) from the power source 202. The first electrical junction box 210 transforms and distributes the high-voltage input to multiple outputs. For example, one set of outputs (e.g., a positive output and a negative output) connects to positive and negative terminals of the second electrical junction box 212 to provide power to the second electrical junction box 212. As another example, another set of outputs connects to various components of the chassis power subsystem 206 to provide power to the motors that rotate the wheels 114 to propel the recreational vehicle 100. The first electrical junction box 210 includes various bus bars, fuses, electrical contacts, etc., to distribute the high voltage input to the outputs. In certain embodiments, the first electrical junction box 210 is coupled between the power source 202 and the subsystems and components that are assembled to the vehicle by its manufacturer before the vehicle is delivered to a recreational vehicle manufacturer and outfitted with additional subsystems for using the vehicle as a recreational vehicle.

The second electrical junction box 212 is coupled between the first electrical junction box 210 and the RV power subsystem 208. As noted above, the second electrical junction box 212 includes positive and negative terminals 214A and 214B that are electrically coupled (e.g., via wires) to positive and negative outputs of the first electrical junction box 210. In certain embodiments, the positive and negative terminals 214A and 214B are adapted to receive high voltage inputs (e.g., 60 volts or higher such as 350-700 volts). The second electrical junction box 212 includes multiple outputs that are electrically coupled to various subsystems and components of the recreational vehicle 100 such as those used for temperature control, storing and preparing food, operating appliances, supplying and disposing of water and waste, etc. In certain embodiments, the second electrical junction box 212 includes an output to provide power to a charging station on the recreational vehicle 100. The charging station can be used to charge the all-terrain vehicle 152 or another electric-powered vehicle or device.

The second electrical junction box 212 includes a switch 216 that can be changed between on and off positions. In certain embodiments, the switch 216 is a handle or bar that can be manually moved (e.g., rotated) between on and off positions. In other embodiments, the switch 216 can be remotely controlled and activated/deactivated (e.g., pressed/depressed) between on and off positions.

Regardless of the specific structure of the switch 216, the switch 216 can turn power off and on to the various outputs of the second electrical junction box 212. For example, the switch 216 can cause power to be removed from an electrical contact 218 that electrically connects the high-voltage input to the various outputs.

By having two electrical junction boxes, the RV power subsystem 208 and its components can be powered off (e.g., via the switch 216 of the second electrical junction box 212) while power is still delivered to the chassis power subsystem 206 to provide power to the motors that rotate the wheels 114 to propel the recreational vehicle 100. As such, the recreational vehicle 100 can still be driven although the RV power subsystem 208 and its components are powered off.

For example, as the recreational vehicle 100 is being outfitted with the RV power subsystem 208, etc., at a manufacturing site, the recreational vehicle 100 can be driven from station to station because the chassis power subsystem 206 is still powered. As such, during manufacture, high-voltage power can be provided to some subsystems and components of the recreational vehicle 100 and turned off for others (e.g., locked out and tagged out) for safety purposes. Turning off power to the RV power subsystem 208 can also save power consumption while the recreational vehicle 100 is not being actively used (e.g., on a dealer's lot, on an owner's driveway).

As another example, if the recreational vehicle 100 experiences an electrical problem (e.g., electrical shorts) with the RV power subsystem 208, the second electrical junction box 212 can be used to turn off power to the RV power subsystem 208, but the recreational vehicle 100 can still be driven because power would still be delivered to the chassis power subsystem 206. As such, an electrical problem with the RV power subsystem 208 does not inhibit the recreational vehicle 100 from being able perform basic and safety functions.

In certain embodiments, if the first electrical junction box 210 is used to disconnect high-voltage power between its inputs and outputs (e.g., via the switch 216 and the electrical contact 218), this prevents high-voltage power from reaching the second electrical junction box 212 because the first electrical junction box 210 is electrically coupled between the power source 202 and the second electrical junction box 212.

Having two electrical junction boxes can also assist recreational vehicle manufacturers to use base vehicles from multiple, different manufacturers. For example, the second electrical junction box 212 could be used in connection with batteries and/or chassis made by two different suppliers such that the RV power subsystem 208 does not have to be customized or modified to work with different suppliers.

The second electrical junction box 212 can include a housing 220 that houses the various electrical components (e.g., bus bars, fuses, electrical contacts) of the second electrical junction box 212. The switch 216 can extend, at least partially, out of and into the housing 220 such that the switch 216 can be moved between on and off positions by a user without needing to access the interior of the housing 220.

The second electrical junction box 212 can include a lid or cover or access panel that, when opened, allows access to the interior of the housing 220. In certain embodiments, the second electrical junction box 212 includes another switch 222 (e.g., magnetic switch, proximity switch) that detects when the cover/lid/access panel is opened. In response to the switch 222 detecting such, high-voltage power connections in the second electrical junction box 212 can be automatically turned off (e.g., via the electrical contact 218) as a safety precaution. In certain embodiments, the switch 222 is a reed switch.

Central Controller

Figure 3:
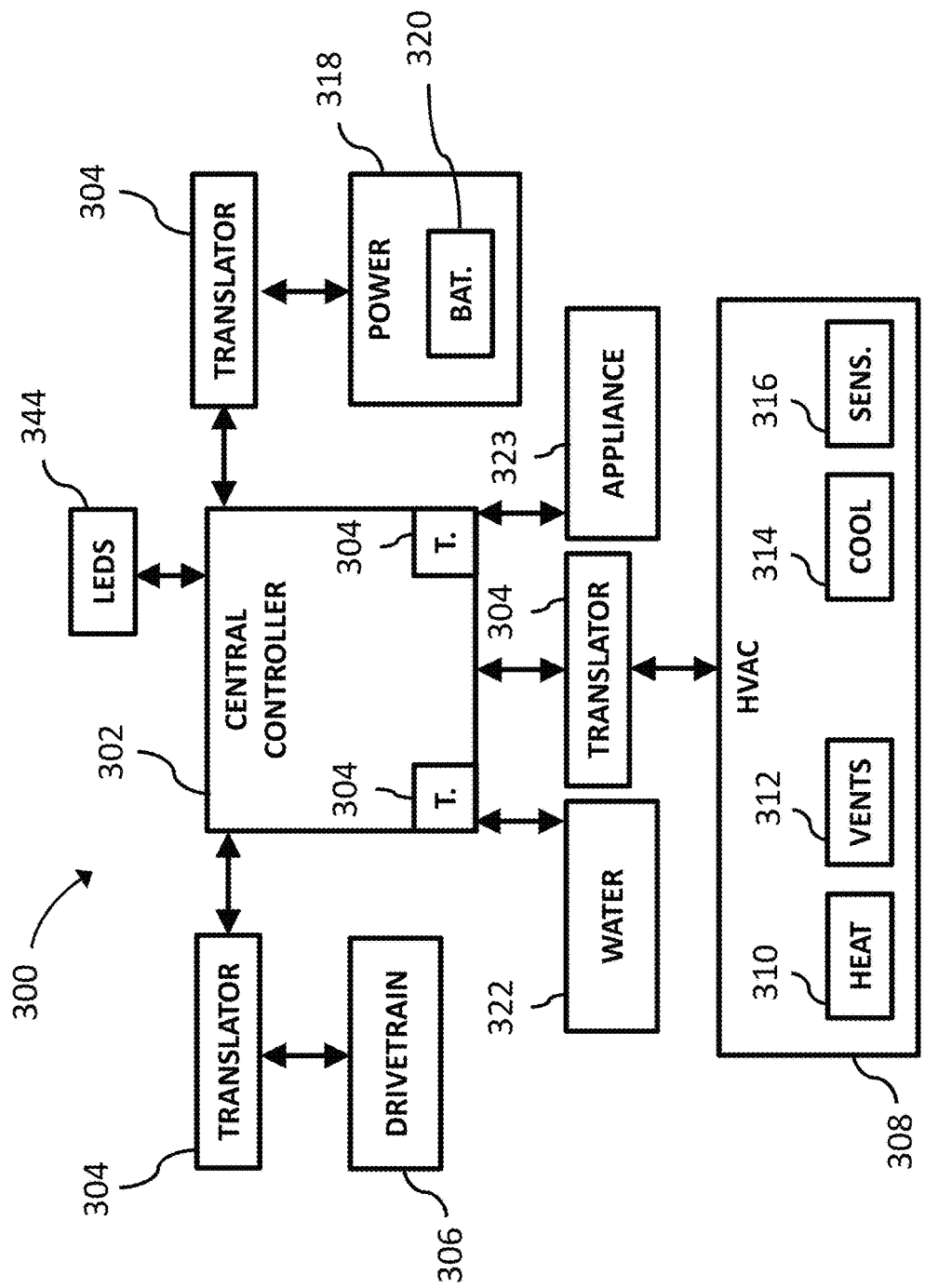
FIG. 3 shows a block diagram of a system of devices, networks, and subsystems for use in connection with recreational vehicles, in accordance with certain embodiments of the present disclosure.

FIG. 3 shows a system 300 of devices, networks, and subsystems for use in connection with one or more vehicles such as those described above. For simplicity, the description below refers to the recreational vehicle 100 of FIG. 1 in connection with the system 300, however the other recreational vehicles shown in the figures and described above also incorporate the system 300.

The system 300 includes a central controller 302 (hereinafter the "controller 302" for brevity), which is communicatively coupled to the various devices, networks, and subsystems of the one or more vehicles. For example, the controller 302 can be communicatively coupled to subsystems and components of both the chassis power subsystem 206 and the RV power subsystem 208 (as shown in FIG. 2). For simplicity, only some of the recreational vehicle's subsystems and components are shown in FIG. 3. The controller 302 can be programmed to communicate with a variety of subsystems and components, including those utilizing low-side drivers, high-side drivers, half-H-bridge drivers, and full-H-bridge drivers. The controller 302 can include various components used in computing devices and that are detailed below in connection with the description of FIG. 4.

The system 300 can also include protocol translators 304 (hereinafter "translators 304" for brevity) that are communicatively positioned in between the various devices, networks, and subsystems. The translators 304 can include hardware and software that enable the devices, networks, and subsystems—which, together, may utilize several separate communication protocols—to communicate with the controller 302 and vice versa. For example, the translators 304 can include or be coupled to a processor (e.g., microprocessor) and memory and be programmed to convert or translate data and commands from one or more protocol languages to one or more other protocol languages and vice versa. The translators 304 can be characterized as being bi-directional translators 304.

In certain embodiments, the controller 302 is coupled to a separate translator 304 for each type of communication protocol used with the system 300. For example, the controller 302 may use one translator 304 to communicate with devices, networks, and subsystems that utilize the Controller Area Network (CAN) protocol, another translator 304 for the SAE J1939 protocol, another translator 304 for the Local Interconnect Network (LIN) protocol, another for the RV-C protocol, and so on. In other embodiments, one or more of the translators 304 are able to translate between multiple protocols. In certain embodiments, one or more translators 304 can be considered to be a component of the controller 302 itself. FIG. 3 shows two translators 304 in such a configuration. In certain embodiments, the controller 302 may not need to utilize one of the translators 304 for communicating with subsystems that also utilize the same protocol. For example, if the controller 302 is programmed to communicate using the RV-C protocol, the controller 302 would not necessarily need to use one of the translators 304 to communicate with subsystems using the RV-C protocol.

The hardware portion of the translators 304 can include electrical connectors that are compatible with a given protocol. For example, the translators 304 may include different electrical receptacles because some protocols may use a single wire at a comparatively low voltage level while other protocols use a comparatively higher voltage level while other protocols use multiple wires. Further, the translators 304 may include one or more transceivers that convert signals to one that is usable by the controller 302. The translators 304 can further include or be coupled to one or more processors (e.g., microprocessors) and memory that includes instructions or software that, when executed by the processor(s), carry out functions such as error correction and signal translation. In certain embodiments, the translators 304 include analog-to-digital converters. For example, the system 300 may include various sensors (e.g., temperature sensors, position sensors, relays) that produce analog signals, which can be converted to digital signals by the analog-to-digital converters for use by the controller 302.

The controller 302 can therefore enable the various devices, networks, and subsystems of a recreational vehicle and vehicle to communicate with each other even though the devices, etc., may be programmed to communicate via different protocols. For example, data or signals from a drivetrain subsystem (using the CAN protocol) can cause the controller 302 to issue commands that ultimately control subsystems and devices that use the RV-C protocol or the LIN protocol and vice versa. As such, the controller 302 can use information (e.g., data, signals) formatted, for example, using the RV-C protocol as inputs to control non-RV-C subsystems and devices and vice versa. More specific examples are provided further below. Further, in certain embodiments, the controller 302 itself outputs commands directly in a given protocol, so a translator 304 may not be necessary for each subsystem, etc., that the controller 302 communicates with.

Drivetrain Subsystem

The system 300 can include a drivetrain subsystem 306. The drivetrain subsystem 306 can include the mechanical and electrical components required to propel the recreational vehicle 100. For example, the drivetrain subsystem 306 can include an engine and/or batteries as well as the sensors (e.g., temperature sensors, position sensors, current sensors) used to ensure that the engine and/or batteries and other drivetrain components are operating properly.

The drivetrain subsystem 306 may include its own controllers (e.g., microcontrollers) that are programmed to observe, measure, control, and communicate with components of the drivetrain subsystem 306. The controllers can include Electronic Control Units (ECUs) of the recreational vehicle 100. The drivetrain subsystem 306 may be designed to use communication protocols such as the CAN protocol or the SAE J1939 protocol.

The controllers of the drivetrain subsystem 306 can be arranged to communicate with the controller 302. For example, the controller 302 may periodically receive certain information from the drivetrain subsystem 306 or the controller 302 may query the drivetrain subsystem 306 for certain information such as gas tank level, battery charge level, and other operational information about the drivetrain subsystem 306. One or more of the translators 304 can enable communication between the controller 302 and the drivetrain subsystem 306. Further, as will be described in more detail below, the controller 302 can be programmed to control operations of the drivetrain subsystem 306.

HVAC Subsystem

The system 300 can also include a heating, ventilation, and air conditioning (HVAC) subsystem 308. The HVAC subsystem 308 can include the mechanical and electrical components required to maintain a desired internal environment in recreational vehicles. For example, the HVAC system 308 can include a heating system 310 (e.g., a furnace), vents 312 that allow exchange between internal living spaces and the external environment, and a cooling system 314 (e.g., air conditioning unit) along with sensors 316 (e.g., temperature sensors, position sensors) used to ensure that the HVAC system 308 is operating properly.

The HVAC subsystem 308 may include its own controllers (e.g., microcontrollers) that are programmed to observe, measure, control, and communicate with components of the HVAC subsystem 308. The controllers of the HVAC subsystem 308 can be arranged to communicate with the controller 302. For example, the controller 302 may periodically receive certain information from the HVAC subsystem 308 or the controller 302 may query the HVAC subsystem 308 for certain information such as interior temperature, exterior temperature, vent position, and other operational information about the HVAC subsystem 308. One or more of the translators 304 can enable communication between the controller 302 and the HVAC subsystem 308. The HVAC subsystem 308 may be designed to use communication protocols such as the RV-C protocol. Further, as will be described in more detail below, the controller 302 can be programmed to control operations of the HVAC subsystem 308.

Electrical Power Subsystem

The system 300 can also include an electrical power subsystem 318 (hereinafter "power subsystem 318" for brevity). The power subsystem 318 can include the mechanical and electrical components required to provide electrical power to components of recreational vehicles. For example, the power subsystem 318 can include electrical storage such as batteries 320 and solar panels along with sensors 322 (e.g., temperature sensors, current sensors) used to ensure that the power subsystem 318 is operating properly. In certain embodiments, as noted above, batteries can also be considered part of the drivetrain.

The power subsystem 318 may include its own controllers (e.g., microcontrollers) that are programmed to observe, measure, control, and communicate with components of the power subsystem 318. The controllers of the power subsystem 318 can be arranged to communicate with the controller 302. For example, the controller 302 may periodically receive certain information from the power subsystem 318 or the controller 302 may query the power subsystem 318 for certain information such as the amount of stored power and other operational information about the power subsystem 318. One or more of the translators 304 can enable communication between the controller 302 and the power subsystem 318. Further, as will be described in more detail below, the controller 302 can be programmed to control operations of the power subsystem 318. In certain embodiments, the batteries 320 are also shared with the drivetrain subsystem 304 to help propel the recreational vehicles and vehicles.

Water Subsystem

The system 300 can also include a water subsystem 322. The water subsystem 322 can include the mechanical and electrical components required to provide adequate water supply and waste and water drainage/storage. For example, the water system 322 can include one or more pumps, piping, faucets, drains, tanks (e.g., clean water tank, grey water tank, black water tank), and sensors (e.g., water level sensors).

The water subsystem 322 may include its own controllers (e.g., microcontrollers) that are programmed to observe, measure, control, and communicate with components of the water subsystem 322. The controllers of the water subsystem 322 can be arranged to communicate with the controller 302. For example, the controller 302 may periodically receive certain information from the water subsystem 322 or the controller 302 may query the water subsystem 322 for certain information such as the water levels of each of the tanks and other operational information about the water subsystem 322. One or more of the translators 304 can enable communication between the controller 302 and the water subsystem 322. Additionally or alternatively, the controller 302 can be programmed to directly control one or more operations of the water subsystem 322 without the use of an intervening controller. For example, the controller 302 may directly query or request readings from sensors of the water subsystem 322 and display the results of the readings such that a user can see the water levels of the various tanks.

Appliance Subsystem

The system 300 can also include an appliance subsystem 323. The appliance subsystem 323 can include the mechanical and electrical components required to operate appliances within a recreational vehicle. For example, the appliance subsystem 323 can include one or more refrigerators, ovens, microwaves, and sensors (e.g., temperature sensors).

The appliance subsystem 323 may include its own controllers (e.g., microcontrollers) that are programmed to observe, measure, control, and communicate with components of the appliance subsystem 323. The controllers of the appliance subsystem 323 can be arranged to communicate with the controller 302. For example, the controller 302 may periodically receive certain information from the appliance subsystem 323 or the controller 302 may query the appliance subsystem 323 for certain information such as whether a given appliance is operating, temperatures, and other operational information about the appliance subsystem 323. One or more of the translators 304 can enable communication between the controller 302 and the appliance subsystem 323. Additionally or alternatively, the controller 302 can be programmed to directly control one or more operations of the appliance subsystem 323 without the use of an intervening controller. For example, the controller 302 may directly query or request readings from sensors of the appliance subsystem 323 and display the results of the readings such that a user can see the internal temperature of the refrigerator or oven.

Computing System and Network Access

Figure 4:
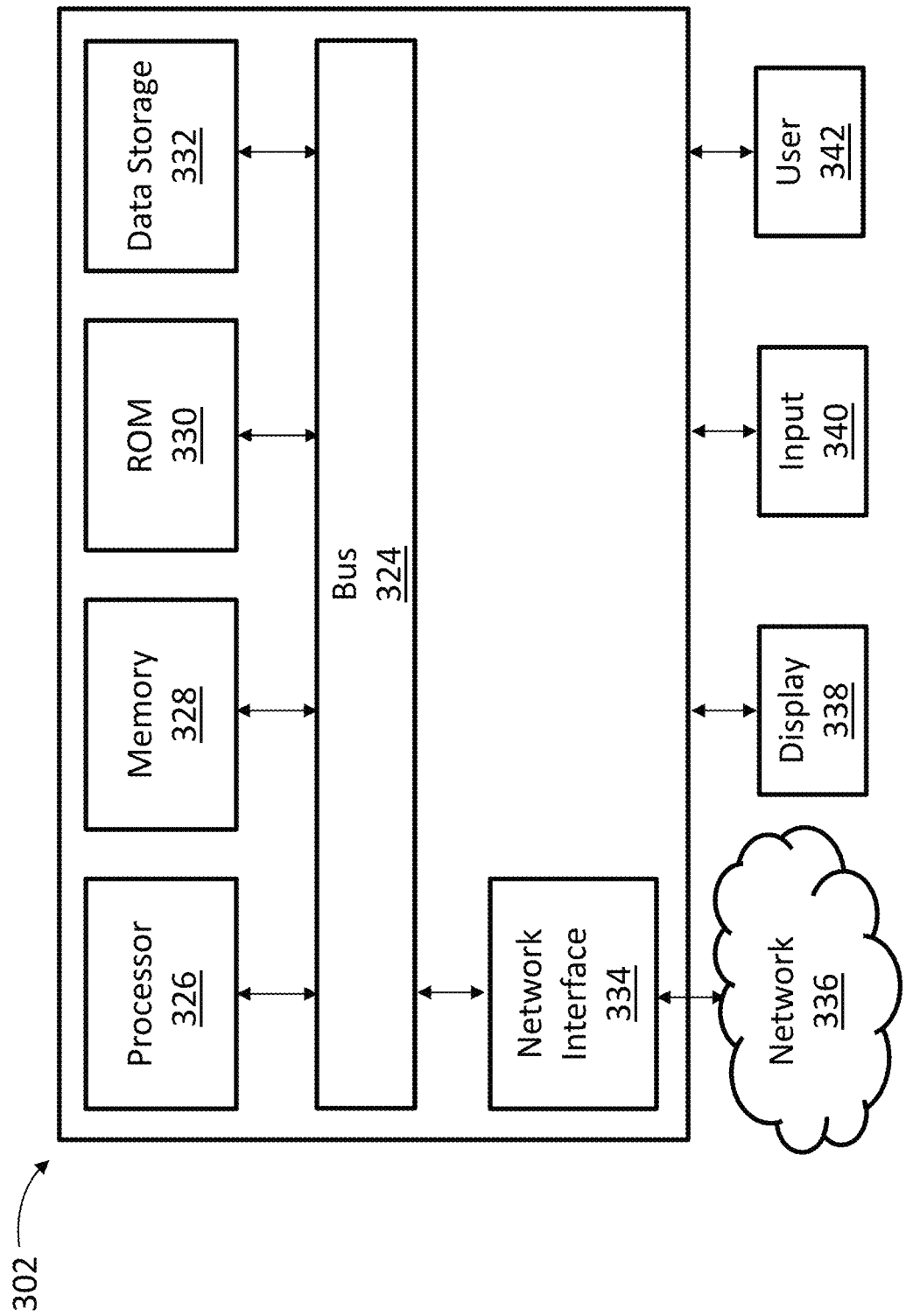
FIG. 4 shows a block diagram of components of the system of FIG. 3 for carrying out functions described herein, in accordance with certain embodiments of the present disclosure.

In certain embodiments, the controller 302 can be considered to be a computer or computing system or a component of a larger computer or computing system. FIG. 4 shows a block diagram of illustrative components of the controller 302 for carrying out aspects of the various functions and processed described here. This diagram is merely an example and the controller 302 may have additional or fewer components.

The controller 302 includes a bus 324 or other communication mechanism for communicating information between or among one or more processors 326 (e.g., microprocessors), memory 328 (e.g., random access memory (RAM), flash memory, and/or other dynamic storage devices), read only memory (ROM) 330, a data storage device 332 (e.g., a hard disk drive, optical disk drive, or solid state drive), and/or a network interface 334.

In certain examples, the network interface 334 is communicatively coupled to a network 336 via one or more communication links. Example network interfaces 334 include wired and wireless signal transmitters and receivers. Example communication links include a wired communication link (e.g., a serial communication), a wireless communication link such as, for example, a short-range radio link, such as Bluetooth, IEEE 802.11, a proprietary wireless protocol, and/or the like. The term "communication link" may refer to an ability to communicate some type of information in at least one direction between at least two devices. The communication links may be a persistent communication link, an intermittent communication link, an ad-hoc communication link, and/or the like. As such, the network interface 334 allows the controller 302 to communicate with a variety of networks, including local networks and cloud computing networks.

The processor(s) 326 can execute software and/or firmware stored in the memory 328 of the controller 302. The software/firmware code contains instructions (e.g., computer code, machine-useable instructions, and the like) that, when executed by the processor 326, cause the controller 302 to perform the functions of the control algorithm described herein. The controller 302 may alternatively or additionally include one or more application-specific integrated circuits (ASICs), field-programmable gate arrays (FPGAs), digital signal processors (DSPs), hardwired logic, or combinations thereof.

The controller 302 can also be communicatively coupled to a display 338 and an input device 340. For example, the controller 302 may be coupled to or physically positioned within a control panel that is positioned within an interior of a recreational vehicle (e.g., attached to a wall or partition of a recreational vehicle). The control panel may include the display 338 and the input device 340. In some embodiments, the display 338 (e.g., an LCD display or a touch screen) is configured to display information to a user of the system 300. In some examples, the input device 340 (e.g., alphanumeric and other keys) is configured to communicate information and commands to the controller 302. In some embodiments, the display 338 is a touchscreen and therefore includes input devices 340.

The controller 302 can also be communicatively coupled to a user device 342 such as a mobile phone or detachable control panel. For example, the user device 342 may include an application (e.g., an app downloaded from an app store) that enables the user device 342 to communicate with the controller 302 directly or indirectly (e.g., via the network interface 334 and network 336). The user device 342 can have its own display and/or user inputs for sending information and commands to the controller 302.

In certain embodiments, the various subsystems and devices of the recreational vehicle 100 periodically or by request send status updates to the controller 302, which can store the status updates in the memory 328. For example, the drivetrain subsystem 306 can send information about the recreational vehicle's current fuel level or remaining stored battery power. As such, the controller 302 can store or otherwise have access to snapshots of the system's status at various points in time. This information can be used by the controller 302 in various routines described below.

Battery Capacity Indicators

As noted above, the controller 302 can receive and store information about the remaining stored battery power of the recreational vehicle's power source 202. For simplicity, this information is referred to below as the "state of charge" of the power source 202. The state of charge can be denoted as a percentage at or between 0% to 100%, where "0" indicates that there is no available power left and "100" indicates that the power source 202 is fully charged. The controller 302 can cause such information to be displayed throughout the recreational vehicle 100 using various approaches described below.

FIG. 4 shows a block 344 that represents one or more lighting subsystems. The lighting subsystem 344 is communicatively coupled to the controller 302 and can include one or more sets or strips of light sources such as light-emitting diodes (LEDs).

FIG. 5A shows an example set of light sources 346 (for simplicity, only two light sources shown in FIG. 5A are denoted with reference number 346). In certain embodiments, each light source 346 can be individually addressable by the controller 302 such that the controller 302 can individually and separately control each light source 346. For example, the controller 302 can turn on, turn off, dim, brighten, change colors each light source 346 separately. Each light source 346 may have its own address or identification number that the controller 302 can use to distinguish among the light sources 346.

In certain embodiments, the set of light sources 346 are positioned on an external surface of the recreational vehicle 100. For example, the light sources 346 may be positioned together on a strip or in a tube that is coupled to a bottom surface 116 (in FIG. 1) of the recreational vehicle 100 and protected by a clear cover or the like. These exterior-positioned light sources 346 can be controlled by the controller 302 to indicate the state of charge of the recreational vehicle's power source.

In some embodiments, all the light sources 346 are controlled to emit one color of light (e.g., green light) when the state of charge is at or between 50% and 100%, emit a different color of light (e.g., yellow light) when the state of charge is at or between 20% and 50%, and emit a different color of light (e.g., red light) when the state of charge is below 20%. The specific color being emitted can change over time as the state of charge changes over time.

In some embodiments, the light sources 346 are controlled to emit different colors depending on the location within the array of light sources. For example, the controller 302 can cause a certain percentage of light sources 346 to emit one color of light (e.g., green light) and another percentage of light sources 346 to emit another color or light (e.g., red light). The percentage of light sources 346 that emit green light can indicate what the current state of charge is. For example, if the state of charge is 75% and there are 100 light sources 346, then 75 of the light sources 346 can emit a green light while the other 25 can emit a red light. In some embodiments, the light sources 346 are controlled to emit different brightness depending on the state of charge.

FIG. 5B shows a button assembly 350, which includes five buttons 352 that each include or are coupled to individually-addressable light sources 354. The button assembly 350 can be positioned on an exterior surface of the recreational vehicle 100. For example, the button assembly 350 could be positioned on the frame between the front passenger-side door and the rear passenger-side sliding door or positioned on one of the doors itself.

The button assembly 350 can be programmed to enable functions (e.g., through the controller 302) such as locking/unlocking doors, closing/opening an awning, closing/opening windows, etc. For example, the buttons may be programmed to cause difference actions depending on whether the buttons are held, tapped, tapped twice, or simultaneously depressed in different combinations. The light sources 354 of the button assembly 350 can be controlled using the same or similar approaches described immediately above to emit light to indicate the state of charge.

Additionally or alternatively, the light sources 354 and/or button assembly 350 can be positioned within the interior of the recreational vehicle 100 and used to indicate the current state of charge. In addition to indicating the state of charge, the various light sources can indicate other status information about the recreational vehicle 100. As one example, the light sources can indicate when the recreational vehicle 100 has recently been plugged into a charging station (e.g., by emitting a green light for a set period of time) or is currently charging.

Light sources can also be used to indicate things like the water temperature. For example, if a user turns on hot water for a shower, one or more light sources in the recreational vehicle 100 could emit light to indicate when the water has reached a desired temperature (e.g., initially emit a blue light that turns to red or green when the water has reached temperature).

Reversible Display

Figure 6A:
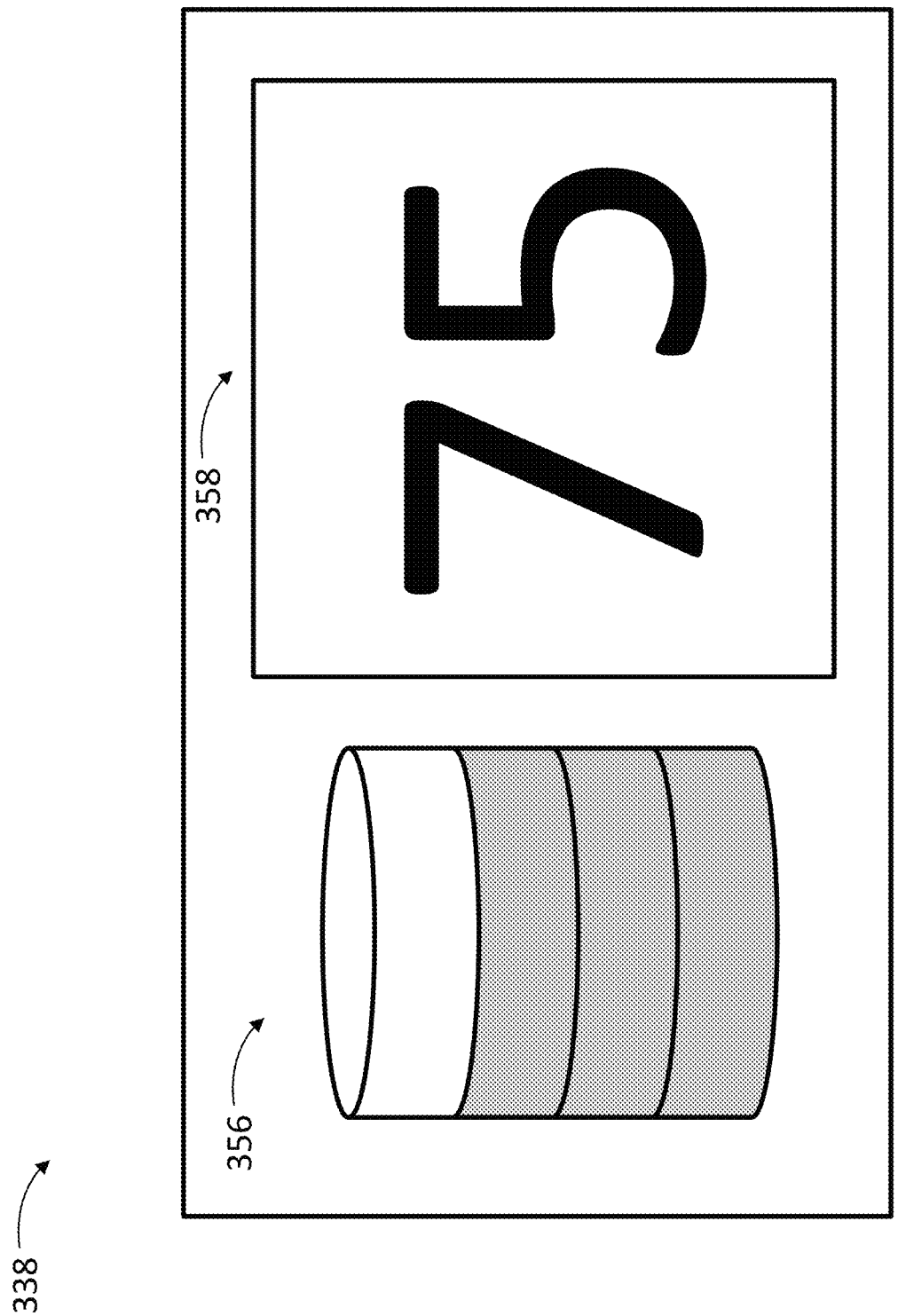
FIGS. 6A and 6B show schematics of screens of a display in different modes, in accordance with certain embodiments of the present disclosure.
Figure 6B:
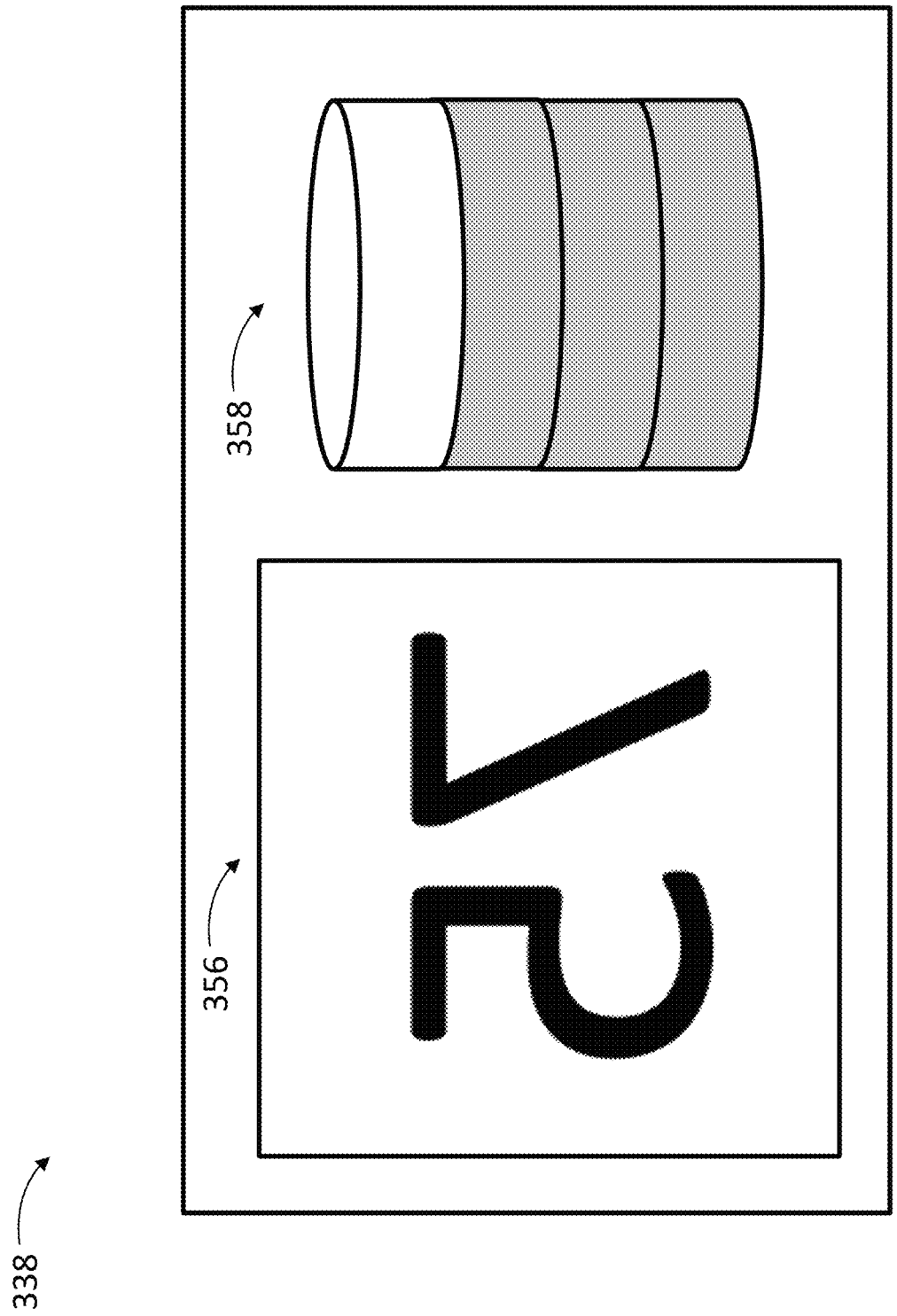

As noted above with respect to FIG. 4, the system 300 may include a control panel with the display 338. For example, the control panel may be attached (e.g., removably attached and detached) to a wall or other structure in the recreational vehicle 100. The display 338 can utilize different screen modes depending on the status of the recreational vehicles. FIGS. 6A and 6B show the display 338 in two different screen modes.

FIG. 6A shows the display 338 in a parked screen mode. As just one example of the types of information the display 338 can show, the display 338 in FIG. 6A includes a visual indicator 356 (e.g., graphics, icons) that visually represents the current state of charge. The display 338 can also include a numerical indicator 358 that shows the current state of charge. The display 338 can include many other screens as part of a graphical user interface, such as screens with icons, buttons, or indicators for controlling and viewing aspects of the various subsystems and devices of the vehicles.

FIG. 6B shows the display 338 in a driving screen mode. As can be seen by comparing FIG. 6A and FIG. 6B, the driving screen mode displays the indicators 356 and 358 in a mirror or reverse image. When the display 338 is reversed, the person driving the recreational vehicle 100 can view the display 338 using the recreational vehicle's rearview mirror, and the driver would see the display 338 in a non-reversed orientation. For example, the display 338 may be positioned within the recreational vehicle 100 such that the display 338 is in the driver's field of view via the rearview mirror.

In certain embodiments, the driving screen mode is initiated when the transmission or power source of the recreational vehicle 100 is transferred to drive or reverse or when an operator manually changes screen modes. When the transmission or power source of the recreational vehicle 100 is transferred to park, the display 338 can revert back to the parked screen mode. In certain embodiments, when the driving screen mode is initiated, the display 338 automatically displays information relevant to operation of the recreational vehicle 100 when being driven.

HVAC Subsystem Control

Automatic Environment Control

Traditional recreational vehicles require occupants to manually and individually control the different components of HVAC systems to establish a desired internal environment. For example, traditional recreational vehicles do not allow occupants to simply set a desired temperature and instead require occupants to manually turn on and off (or adjust) heating systems, cooling systems, and vents to control the interior temperature and environment.

In certain embodiments, the controller 302 can be programmed to efficiently utilize the energy use of the HVAC subsystem 308 while also creating a user-friendly experience. As noted above, the recreational vehicles' HVAC subsystem 308 and its components can be communicatively coupled to the controller 302.

In certain embodiments, the controller 302 can be programmed such that the user needs to only set a desired interior temperature (e.g., via a thermostat or a mobile application on a mobile device) and optionally select "heat" or "cool," and the controller 302 can determine how to operate the components of the HVAC subsystem 308 to reach the selected temperature. How the controller 302 accomplishes reaching the selected temperature may depend on the status of the various subsystems of the recreational vehicle. For example, if the recreational vehicle 100 is plugged into shore power, the recreational vehicle 100 may not consider inputs such as available battery power. However, if the power source is the recreational vehicle's batteries, the controller 302 can take into account the current state of charge. As another example, the power source may be a generator, which may cause the controller 302 to utilize a higher-efficiency mode that is similar or the same as when the batteries are the power source for the HVAC subsystem 308. The following are a few examples of higher-efficiency approaches for reaching a desired internal temperature.

In certain embodiments, in response to a requested interior temperature, the controller 302 may first determine the current interior temperature from a sensor positioned in the recreational vehicle 100. The controller 302 may also determine an exterior temperature from a sensor coupled to the recreational vehicle 100 or from a weather mobile application that tracks or predicts local temperatures. The controller 302 may also receive sensor signals or information about current or predicted weather conductions such as precipitation, etc.

If the requested temperature and exterior temperature is lower than the measured interior temperature, the controller 302 may be programmed to open the vents 312 and turn on a fan to pull in the cooler air from the exterior to reach the desired temperature to save energy consumption by the cooling system 314. In certain embodiments, this approach is used to initially pre-cool the interior for a period of time or until reaching a certain interior temperature-after which the cooling system 314 is turned on and used to reach and/or maintain the final desired temperature. In certain embodiments, if precipitation is detected (e.g., via a rain sensor or weather mobile application), the controller 302 can bypass opening the vents 312 to avoid precipitation entering the interior of the recreational vehicle or the controller 302 can close the vents 312 in the event the vents 312 are already open. In some embodiments, the controller 302 can reduce the speed of the vents 312 if the detected rain is light (e.g., a drizzle).

In certain embodiments, if the humidity of the exterior air a greater than a threshold (e.g., 70-80%), then the controller 302 can be programmed to use the cooling system 314 instead of opening the vents 312.

Window Sensor

Figure 7:
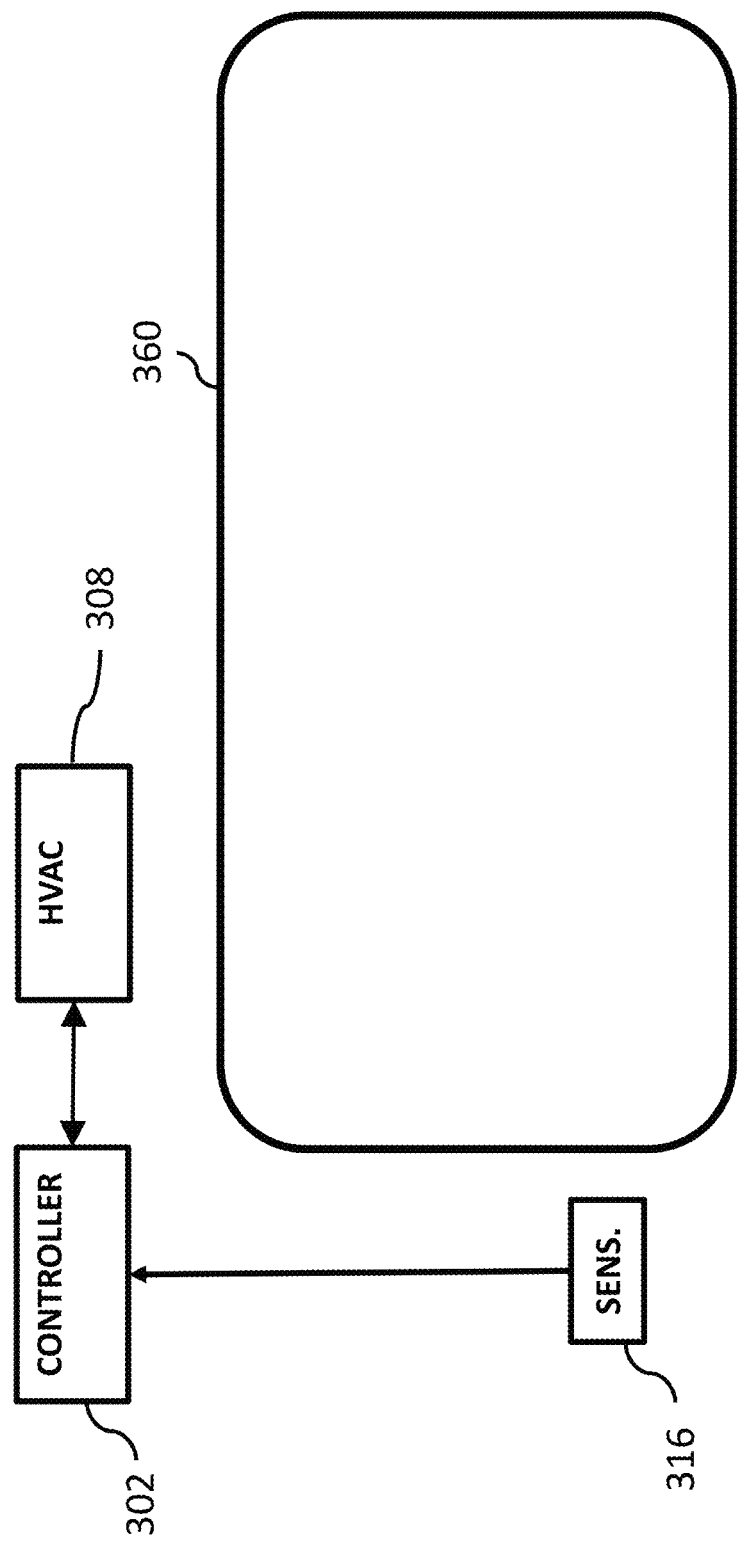
FIG. 7 shows a block diagram of a parts of system of FIG. 3 and a window of one of recreational vehicles, in accordance with certain embodiments of the present disclosure.

FIG. 7 shows a block diagram of the controller 302, the HVAC subsystem 308, and the sensor 316 (which are also shown in FIG. 3). FIG. 7 also shows a window 360. The window 360 in FIG. 7 represents one or more of the windows of the recreational vehicles 100/120/140 shown in FIGS. 1A-1C. Each of the figures show multiple windows positioned at various locations along the recreational vehicles 100/120/140. The window 360 can be opened and closed to allow or prevent air exchanging between the interior and exterior of the recreational vehicles 100/120/140.

The sensor 316 is arranged and configured to detect when the window 360 is open or closed. For example, the sensor 316 can be a position sensor or a proximity sensor that, respectively, detects the position or proximity of the window 360 with respect to the sensor 316. In certain embodiments, the sensor 316 is a magnetic sensor such as a magnetic reed sensor. Regardless of the specific type of sensor, the sensor 316 can send a signal to the controller 302 to indicate when the window 360 is open or closed. The controller 302 can then use the status of the window 360 for various operations described below.

As one example, if the controller 302 determines (via a signal from the sensor 316) that the window 360 is open and that it is currently raining or will rain, the controller 302 can send a warning or alert to a user's mobile application. As another example, if the controller 302 determines that (1) the window 360 is open, (2) cooling is required to reach a desired interior temperature, and (3) the exterior temperature is greater than the interior temperature, the controller 302 can send a warning or alert to the user's mobile application. Additionally or alternatively, regardless of the exterior temperature, the controller 302 can open the vents 312 (as shown in FIG. 3) instead of turning on the air conditioner to avoid spending energy on cooling air that may exit through the open window 360. Similar approaches can be used in the event that heating is required to reach a desired temperature and the window 360 is open.

In certain embodiments, if the controller 302 determines that there will be an upcoming large (e.g., 10+ degree) increase or decrease in temperature of the exterior air (e.g., via a mobile weather application) and the window 360 is open, then the controller 302 can be programmed to send a warning or alert to the user's mobile application or can cause the window 360 to be shut automatically.

In addition to the sensor 316 for the window 360, the recreational vehicle 100 may include a sensor that is arranged and configured to detect when an awning is extended/open. In certain embodiments, if the controller 302 determines that the awning is open and that there is currently or soon to be windy conditions (e.g., winds at 20+ miles per hour), then the controller 302 can be programmed to send a warning or alert to the user's mobile application or can cause the awning to be retracted automatically. As another example, if the controller 302 determines that the awning is open, the controller 302 can be programmed to send a signal (e.g., command or message) to the drivetrain subsystem 306 to prevent the drivetrain subsystem 306 from being driven (e.g., preventing the transmission from shifting from park to drive).

Communication System and Graphical User Interface

Figure 8:
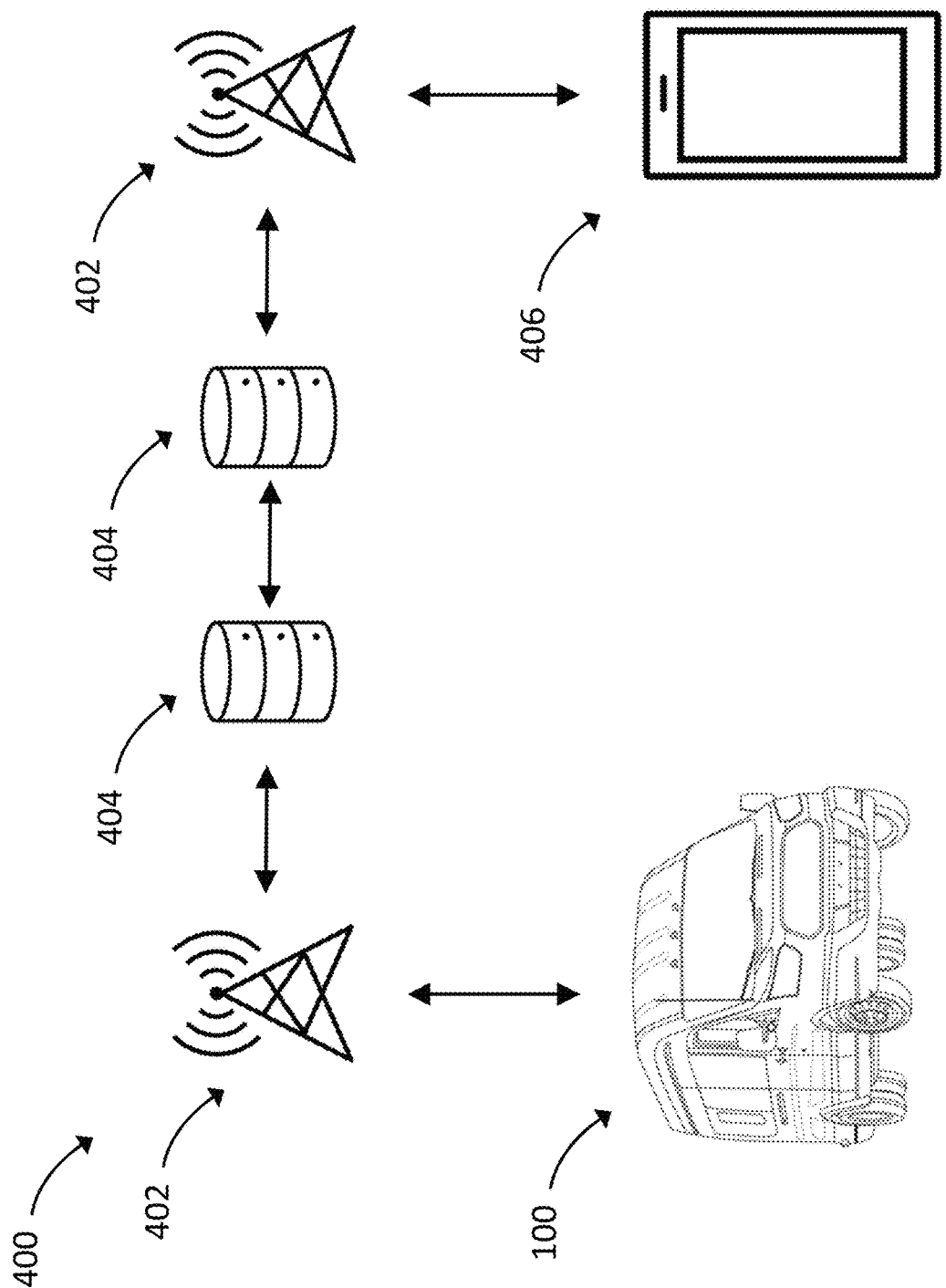
FIG. 8 shows a communication system, in accordance with certain embodiments of the present disclosure.

FIG. 8 shows a communication system 400, which includes one or more cell phone towers 402 and one or more servers 404.

FIG. 8 also shows the recreational vehicle 100 of FIG. 1 which includes equipment to wirelessly communicate with the cell tower 402 and/or the server 404. As noted above, the recreational vehicle 100 includes the controller 302, which was discussed at length herein. The controller 302 receives data (e.g., via various signals) about the recreational vehicle 100 from the various subsystems (including those that communicate using different communication protocols), components, and sensors. In certain embodiments, the controller 302 translates the various signals from the subsystems, etc., to the CAN protocol. The translated signals are sent to a wireless transmitter of the recreational vehicle 100 that is programmed to communicate the translated signals to the cell tower 402. The cell tower 402 can then relay the translated signals to the server 404, which can store certain data and process/analyze/parse/structure the data. The server 404 can then communicate with the cell tower 402 (which may be the same or different cell tower 402 that communicated the translated to the server 404) such that the data is transmitted to a user's mobile device 406 (e.g., via a mobile application).

Figure 9:
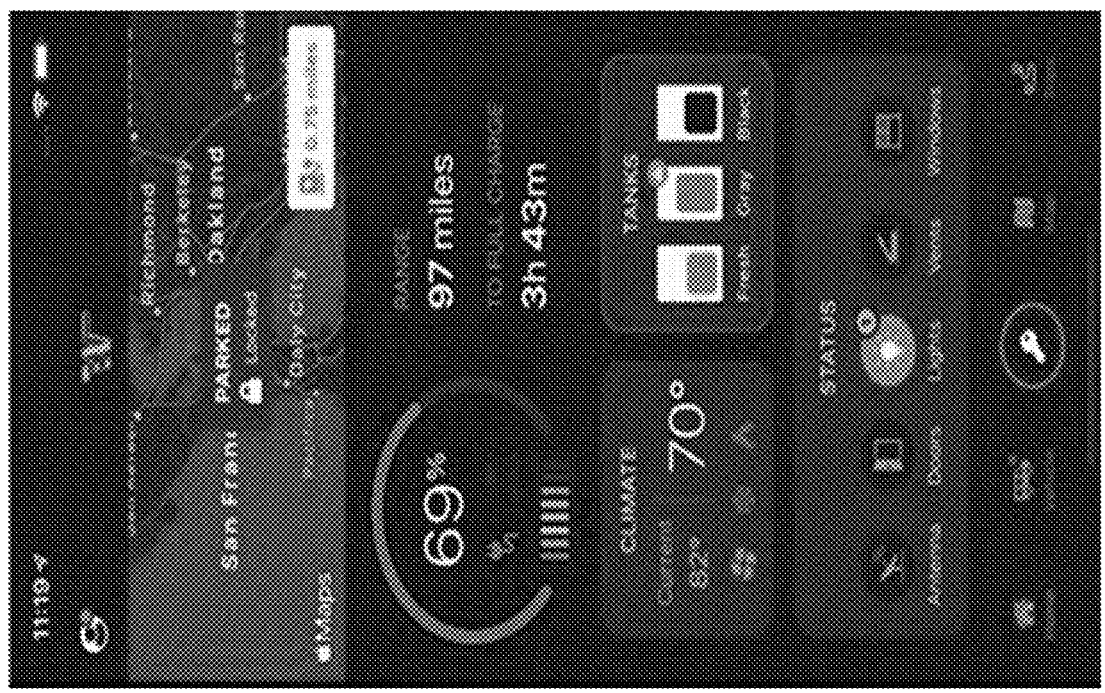
FIG. 9 shows a graphical user interface, in accordance with certain embodiments of the present disclosure.

FIG. 9 shows a graphical user interface (GUI) 410 of a mobile application for use with the recreational vehicle 100 and the communication system 400. The GUI 410 can include a home screen such as that shown in FIG. 9 which displays information about the recreational vehicle 100 and its various systems, subsystems, and components and also enables a user to control various aspects of the recreational vehicle 100 and its systems, etc.

As one example, the home screen of the GUI 410 can include information relating to the power system 200 such as the state of charge of batteries, the remaining travel range, the time required to reach a full charge, and the like. As another example, the home screen can include information about the climate (e.g., temperature) internal to the recreational vehicle 100 and external. The home screen can also include buttons that allow a user to control the HVAC subsystem 308 such as cooling, heating, or automatic climate control settings. As another example, the home screen can include information about the water subsystem 322 such as the current levels of the fresh water, gray water, and black water tanks of the recreational vehicle 100. The home screen can also include buttons/links to other screens for viewing information about or controlling the power subsystem, drivetrain subsystem, HVAC subsystem, lighting subsystem, etc., of the recreational vehicle 100.

In certain embodiments, in addition to displaying the GUI 410 on a user's cell phone, the recreational vehicle 100 can display the GUI 410 on an in-dash infotainment system. The in-dash system can include a screen (e.g., touchscreen) in the recreational vehicle's front dash that can reproduce or mirror the GUI 410 such that the driver and/or passenger can view and interact with the GUI 410 from the front dash. For example, the screen in the vehicle's front dash can be communicatively coupled to a processor operating an Apple or Android operating system, which can download and operate the mobile application. As such, a user can view information about and control aspects of the recreational vehicle 100 from the screen in the front dash.

Data Transmission Speeds

As noted above, the system 300 can include hardware and software that enable the devices and subsystems to communicate with the controller 302 and vice versa even though the devices, etc., utilize different communication protocols. In addition to removing protocol-based limitations, the system 300 can remove limitations on data transmission speeds, such as the 1 megabyte-per-second limit using the traditional CAN protocol.

In certain embodiments of the present disclosure, the system 300 can include hardware (e.g., busses, wires, wireless transmitters) and software that permit data transfer speeds greater than 1 MB/see (e.g., >5 MB/see, 1-10 MB/sec). For example, in addition to wiring required by the various protocols of the recreational vehicle 100, the system 300 may include one or more data transmission wires or wireless transmitters, which can be used for applications requiring faster data transmission speeds. The additional data speeds can assist with incorporating more complex and data-heavy subsystems and devices into vehicles. For example, data transmission speeds greater than 1 MB/see can allow the controller 302 to process and communicate video signals (e.g., from cameras on the vehicles) to the various subsystems and devices and, perhaps, bypass traditional protocols used by recreational vehicles.

Controller Operation Modes

In certain embodiments, the controller 302 is programmed with different operation modes. For example, the memory 328 of the controller 302 may store instructions such as routines that are unique to different modes. The modes can be initialized in response to different events.

As a first example, one of the modes can be characterized as a manufacturer mode. This mode may be the initial default mode for the controller 302. For example, when a recreational vehicle is first powered on, the controller 302 can be powered and programmed to run the manufacturer mode. In this mode, the controller 302 can run various diagnostic routines as the recreational vehicles are being assembled and completed before shipment to customers or dealers. The controller 302 can communicate with a central server for a manufacturing site and provide periodic updates or alerts about the status of the recreational vehicles and their various devices and subsystems. In some embodiments, the controller 302 can be communicatively coupled to a global positioning sensor (GPS) or other types of locational sensors such that the controller 302 can communicate its position. Using position data could help determine where respective recreational vehicles are located on a manufacturer's production site.

As a second example, another one of the modes can be characterized as a dealer mode. Once the recreational vehicles have been assembled, tested, and approved for shipping to a dealer, the controller 302 can be switched from the manufacturer mode to the dealer mode (e.g., by the manufacturer). In this mode, the controller 302 can run routines that are useful while the recreational vehicles are parked on a dealer's lot, for example, for maintenance and/or marketing purposes. In the dealer mode, the controller 302 could control recreational vehicles' infotainment systems to cause a television or other display to automatically play a pre-recorded marketing video when a door of the vehicles is opened or when the infotainment systems are turned on. As another example, the controller 302 can count the number of times doors have been opened to keep track of how often the recreational vehicles are being shown to potential customers. As another example, the controller 302 can send reminders to a dealer's central server about the status of the recreational vehicles (e.g., whether the vehicles are connected to shore power) or diagnostic related information. In some embodiments, the controller 302 can be communicatively coupled to a GPS or other types of locational sensors such that the controller 302 can communicate its position. Using position data could help determine where respective recreational vehicles are located on a dealer's site.

As a third example, another one of the modes can be characterized as a customer mode or standard operating mode. Once the recreational vehicles have been sold to a customer, the controller 302 can be switched from the dealer mode to the customer mode. In this mode, the controller 302 can run routines that are useful for end users such as the various functions described above and below in more detail (e.g., querying various subsystems of the recreational vehicle) and diagnostic and maintenance information (e.g., maintenance reminders).

Electrical Connectors

Figure 10A:
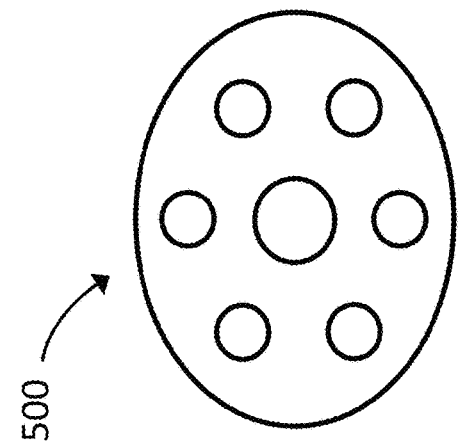
FIGS. 10A-10C show schematics of electrical connectors, in accordance with certain embodiments of the present disclosure.
Figure 10B:
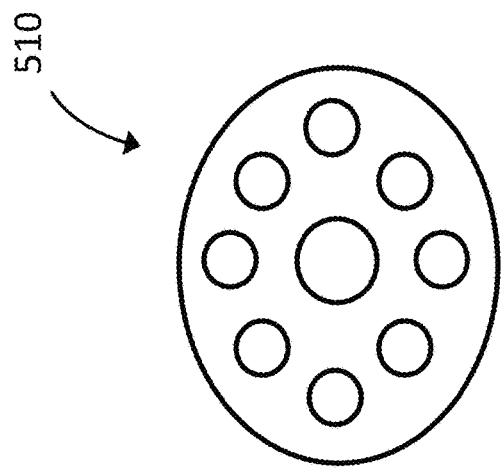
Figure 10C:
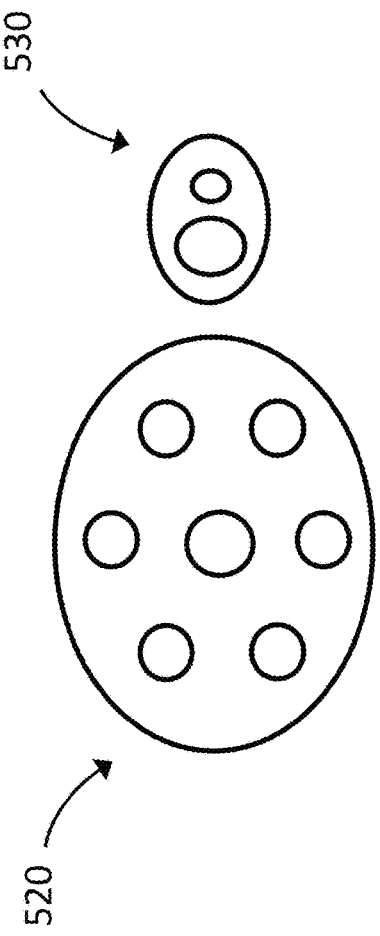

FIGS. 10A-10C show schematics of different electrical connectors that can be used to facilitate communication between vehicles and/or equipment. FIG. 10A shows a 7-pin connector 500, FIG. 10B shows a 9-pin connector 510, and FIG. 10C shows a 7-pin connector 520 and a 2-pin connector 530. Each connector can be part of a pair. For example, one vehicle can have a receptacle connector (e.g., a female connector) and the other vehicle can have a corresponding plug connector (e.g., a male connector). An extension cord can be communicatively coupled between the pair of connectors and may also have its own corresponding electrical connectors at each end of the extension cord. Although each of the connectors are shown as being round, the connectors can be other shapes (e.g., oval, rectangle, square).

The connectors involve adding two pins or two electrical and/or communication paths to traditional electrical connectors typically used with recreational vehicles. For example, the 7-pin connector 500 includes 5 pins traditionally used in a 5-pin connector, which includes pins that are used for taillights, brakes, left turn signal and brake lights, right turn signal and brake lights, and ground. The 9-pin connector 510 includes 7 pins traditionally used in a 7-pin connector, which includes pins used for tail/running lights, auxiliary power, right turn and brake lights, backup lights, brakes, left turn and brake lights, and ground. Both the 7-pin connector 500 and the 9-pin connector 510 include one additional pin for power and another additional pin for communications. As will be described in more detail below, the power pin can be used to transfer power between the vehicles which can facilitate the ability to charge batteries, for example. The communication pin can be used to transfer command signals and data between the vehicles (e.g., between the vehicles' respective controllers) to facilitate various functions described below.

The 7-pin connector 520 of FIG. 10C can be a traditional 7-pin connector (as described above) that is used along with the 2-pin connector 530, which can include one pin for power and another for communications. As such, the power pin and communication pin can be part of a connector that is separate from a traditional 5- or 7-pin connector. Alternatively, the 7-pin connector 520 and the 2-pin connector 530 can be physically connected to each other.

In certain embodiments, the power pin has a larger diameter than all or some of the other pins of the electrical connector. For example, the power pin may communicate power signals with a voltage that is higher than some or all of the other pins. In certain embodiments, the communication pin can have a smaller diameter than all or some of the other pins of the electrical connector. The communication pin may use a lower voltage than some or all of the other pins.

In certain embodiments, instead of having a separate pin for communications, signals such as command signals or those containing data can be wirelessly transmitted between vehicles. For example, the vehicles can transmit wireless signals to each other using one or more wireless communication protocols (e.g., WiFi, Bluetooth, 3G, 4G, 5G, among others). In such embodiments, the connectors described above may only include one additional pin (e.g., the power pin) than that traditionally used in connectors for recreational vehicles.

Although the description above only refers to adding pins/communication paths for traditional 5- and 7-pin connectors, it is appreciated that such pins/communication paths can be incorporated with or added to electrical connectors with a different number of pins (e.g., 4-9 pins, 4-7 pins).

In addition to electrical connectors, the vehicles can have one or more pneumatic lines (e.g., tubes, hoses) communicatively coupled between the vehicles. The pneumatic lines can allow the ability to utilize brakes of both vehicles. For example, the action of pressing the brake pedal of the towing vehicle can cause the brakes of the towing vehicle to be pressed as well as (via the pneumatic lines) the brakes of the towed vehicle. This can provide additional braking abilities of the towing vehicle and towed vehicle.

Vehicle-to-Vehicle Communications and Power Sharing

As noted above, the recreational vehicles 100/120/140 can be communicatively coupled to the vehicles such as cars, trucks, and sport utility vehicles. Communications between the vehicles can be facilitated by the electrical connectors 500/510/520 or other types of electrical connectors and managed by the controller 302.

In some embodiments, both the recreational vehicle and the vehicle include one or more batteries that are used to power devices and subsystems, while in other embodiments, the recreational vehicle and the vehicle also include an engine. Regardless of the vehicles' arrangement, the controller 302 can manage power sharing or charging between the vehicles, and the power sharing can be bi-directional.

As one example, the vehicle that is towing can transfer power to the vehicle being towed. In embodiments where the towing vehicle is powered by an engine, that vehicle may be generating more power than is needed for its own electrical needs. The controller 302 can be programmed to determine if the towing vehicle is generating excess power and if the towed vehicle's batteries should be charged. This approach may be facilitated by the controller 302 receiving information from sensors about current power generation and power storage and comparing that information to pre-determined thresholds. The controller 302 can send a message or command to the towing vehicle's drivetrain subsystem (e.g., via the communication pin on the electrical connectors 500/510/520) to cause the towing vehicle to transfer power to the towed vehicle (e.g., via the power pin on the electrical connectors 500/510/520).

As another example, the vehicle that is being towed can transfer power to the vehicle that is towing. In embodiments where the towing vehicle is powered by batteries, that vehicle will be using its stored power to propel the two vehicles. The controller 302 can be programmed to determine (1) if the towing vehicle is running low on power (e.g., less than 25% remaining power) and (2) if the towed vehicle has power stored in its batteries that can be transferred to the towing vehicle (e.g., greater than 25% remaining power). In some embodiments, an operator can manually initiate power transfer between the two vehicle and set desired thresholds for initiating and stopping the transfer of power. The controller 302 can send a message or command to the towed vehicle's power subsystem to cause the towed vehicle to transfer power to the towing vehicle (e.g., via the power pin on the electrical connectors 500/510/520). Power can be continued to be transferred until the towed vehicle's power source drops below a given power threshold or until the operator manually stops the power transfer between the vehicles. In this example, the towed vehicle can act as auxiliary power storage for the towing vehicle and therefore extend the range of the towing vehicle.

As another example, the vehicle that is towing can communicate with the towed vehicle to control or request assistance from the towed vehicle in various scenarios. One scenario involves the towing vehicle pulling the towed vehicle up a steep grade (e.g., up a mountain road). In that scenario, the towing vehicle can send a command to the controller 302 to cause power to be sent to the wheels of the towed vehicle such that the towed vehicle helps or otherwise assists with propelling the two vehicles using its power subsystem. This can reduce the load on the power subsystem of the towing vehicle. Another scenario involves the towing vehicle pulling the towed vehicle down a steep grade. In that scenario, the towing vehicle can send a command to the controller 302 to initiate or control braking of the towed vehicle. In certain embodiments, these assisted-power or -braking approaches can be initiated when the power required to propel the towing vehicle reaches or approaches a threshold, when GPS data indicates a steep grade, when a steep grade is detected by one or more sensors of the vehicles, and/or by an operator manually requesting assisted power or braking.

As another example, the vehicles can share power when the vehicles are parked. In embodiments where one vehicle includes an engine and the other vehicle includes batteries, the engine-powered vehicle can essentially act as a generator for the battery-powered vehicle. For example, if the recreational vehicle is battery powered, the controller 302 can determine when the recreational vehicle's power subsystem 318 has depleted its stored power below a threshold level. In response, the controller 302 can send a command to the engine-powered vehicle (e.g., to the vehicle's drivetrain subsystem via the communication pin on the electrical connectors 500/510/520) that requests or otherwise causes that vehicle to start its drivetrain (e.g., engine and alternator) and send excess power (e.g., via the power pin on the electrical connectors 500/510/520) to the batteries of the recreational vehicle. As noted above, the controller 302 can have access to snapshots of the operating status of the vehicles' subsystems, etc. As such, the controller 302 could refer to the last received fuel level status update of the engine-powered vehicle and may only initiate a command to start the engine if the fuel level is above a threshold (e.g., the tank is 25% full), which can be set to avoid the engine-powered vehicle from dropping below a certain fuel level. Further, the controller 302 can send a command to the engine-powered vehicle to shut-off once the controller 302 determines that the fuel level has dropped below a certain fuel level. In embodiments, an operator can set desired thresholds and can initiate and stop power transfer between the two parked vehicles.

Storage Modes

In addition to the different operation modes described above, the controller 302 can be programmed with different storage modes. For example, the memory 328 of the controller 302 may store routines that are unique to the different modes. These different modes can be initiated manually by an operator the recreational vehicles 100/200.

As a first example, one of the modes can be characterized as a plugged-in storage mode. This mode can be set when the recreational vehicle is in short-term or long-term storage (e.g., winter storage) and is plugged into shore power or the like. In this mode, the recreational vehicle can periodically "wake up" and run routines to check the status of the subsystems, networks, and devices of the recreational vehicle. If one of the subsystems, etc., is not operating properly as determined by the controller 302 or in response to an error message, the controller 302 can send an alert in a format and as desired by the owner of the recreational vehicle. Also in this mode, if the recreational vehicle is battery powered, the controller 302 can periodically measure the power level of the batteries and maintain the batteries in a desired power level range. For example, batteries such as lithium-based batteries should not be kept at 100% full charged capacity and instead should be kept at a lower range (e.g., up to 65% of full charged capacity). As such, the controller 302 can schedule periodic checks and initiate small power boosts to the batteries to maintain a desired power level range.

As another example, one of the modes can be characterized as an off-the-grid mode. This mode can be set when the recreational vehicle is being stored but is not plugged into shore power. In this mode, the recreational vehicle can periodically check the status of the subsystems, etc., although less often than the plugged-in storage mode. Instead of communicating the status updates to an external party, the recreational vehicle can store the status updates until the recreational vehicle is connected to power.

In any of the above-described storage modes, the controller 302 can also be programmed with various security routines. For example, using signals from sensors (e.g., proximity sensors), the controller 302 can determine whether a door opens or whether exterior steps have extended down. In such events, the controller 302 can create and send an alert to a mobile application or via a text message, telephone call, e-mail and the like. Further, the controller 302 can initiate a local alarm or warning. Further yet, the controller 302 can cause a camera (e.g., backup camera, side mirror camera, interior camera) to take pictures, which can be stored to the memory 328 and/or communicated to a mobile application or sent via text message, etc.

CONCLUSION

Although the features above were described in the context of recreational vehicle applications, the features could be implemented in marine applications. For example, boats can include controllers, sensors, etc., which can be used to control aspects of various subsystems such as power subsystems. As another example, marine applications can use electrical connectors that enable communication and/or power sharing between power sources.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:
1. A recreational vehicle comprising:
 a power source, a first electrical junction box, a second electrical junction box, a chassis power subsystem, and a recreational vehicle (RV) power subsystem, wherein:
 the first electrical junction box is electrically coupled between the power source and the second electrical junction box,
 the first electrical junction box is electrically coupled between the power source and the chassis power subsystem,
 the second electrical junction box is electrically coupled between the first electrical junction box and the RV power subsystem, and
 the first electrical junction box and the second electrical junction box are arranged and electrically connected such that the power source can selectively provide power to the chassis power subsystem but not the RV power subsystem.

2. The recreational vehicle of claim 1, wherein the chassis power subsystem facilitates power supply to brake lights, headlights, and dash lights.

3. The recreational vehicle of claim 1, wherein the chassis power subsystem comprises electrical motors arranged to directly or indirectly rotate wheels.

4. The recreational vehicle of claim 1, wherein the RV power subsystem comprises a heating, ventilation, and air-conditioning (HVAC) subsystem.

5. The recreational vehicle of claim 4, wherein the HVAC system comprises a heater and an air-conditioner.

6. The recreational vehicle of claim 1, wherein the power source provides 60-750 volts to the first electrical junction box.

7. The recreational vehicle of claim 1, wherein the second electrical junction box includes a switch, a power input, and a power output.

8. The recreational vehicle of claim 7, wherein the switch is configured to be switched between an off position and an on position.

9. The recreational vehicle of claim 8, wherein, in the off position, the power input and the power output are not electrically coupled to each other.

10. The recreational vehicle of claim 8, wherein, in the off position, the switch has caused electrical contacts to physically separate from each other.

11. The recreational vehicle of claim 7, wherein the switch is configured to disconnect power between the power source and the RV power subsystem.

12. The recreational vehicle of claim 7, wherein the second electrical junction box comprises a housing with an interior space, wherein the switch is accessible from outside the housing.

13. The recreational vehicle of claim 1, wherein the first electrical junction box and the second electrical junction box are positioned under a hood of the recreational vehicle.

14. The recreational vehicle of claim 1, further comprising a body that houses a cab area and a living space.

15. The recreational vehicle of claim 1, wherein the chassis power subsystem facilitates power supply to headlights, wherein the chassis power subsystem includes electrical motors arranged to directly or indirectly rotate wheels, wherein the RV power subsystem comprises a heating, ventilation, and air-conditioning (HVAC) subsystem.

16. The recreational vehicle of claim 1, wherein the first electrical junction box has a first housing, wherein the second electrical junction box has a second housing separate from the first housing, wherein the first housing houses a first set of bus bars, fuses, and electrical contacts: wherein the second housing houses a second set of bus bars, fuses, and electrical contacts.

17. A recreational vehicle comprising:
a power source, a first electrical junction box, a second electrical junction box, a chassis power subsystem, and a recreational vehicle (RV) power subsystem, wherein:
the first electrical junction box is electrically coupled between the power source and the second electrical junction box,
the first electrical junction box is electrically coupled between the power source and the chassis power subsystem,
the second electrical junction box is electrically coupled between the first electrical junction box and the RV power subsystem,
the second electrical junction box includes a switch, a power input, and a power output,
the second electrical junction box includes a housing with an interior space, and the switch is accessible from outside the housing.

18. The recreational vehicle of claim 17, wherein:
the chassis power subsystem facilitates power supply to brake lights, headlights, and dash lights; and
the RV power subsystem comprises a heating, ventilation, and air-conditioning (HVAC) subsystem.

19. The recreational vehicle of claim 17, wherein the first electrical junction box and the second electrical junction box are positioned under a hood of the recreational vehicle.

20. The recreational vehicle of claim 17, wherein the switch is configured to disconnect power between the power source and the RV power subsystem.

\* \* \* \* \*